US012629300B2

(12) United States Patent
Bilge et al.

(10) Patent No.: US 12,629,300 B2
(45) Date of Patent: May 19, 2026

(54) CHAIR AND BED MOBILITY APPARATUS

(71) Applicants: Henry H. Bilge, Fort Lee, NJ (US); Ecrin Z. Bilge, Fort Lee, NJ (US); Selin Bilge, Fort Lee, NJ (US); Michael Kaplan, Lawrence, NY (US)

(72) Inventors: Henry H. Bilge, Fort Lee, NJ (US); Ecrin Z. Bilge, Fort Lee, NJ (US); Selin Bilge, Fort Lee, NJ (US); Michael Kaplan, Lawrence, NY (US)

( * ) Notice: Subject to any disclaimer, the term of this patent is extended or adjusted under 35 U.S.C. 154(b) by 323 days.

(21) Appl. No.: 17/883,841

(22) Filed: Aug. 9, 2022

(65) Prior Publication Data

US 2024/0050295 A1 Feb. 15, 2024

(51) Int. Cl.

| | |
|---|---|
| ***A61G 5/00*** | (2006.01) |
| ***A61G 7/015*** | (2006.01) |
| ***A61G 7/018*** | (2006.01) |
| ***A61G 7/02*** | (2006.01) |

(52) U.S. Cl.
CPC ............. *A61G 5/006* (2013.01); *A61G 7/015* (2013.01); *A61G 7/018* (2013.01); *A61G 7/02* (2013.01)

(58) Field of Classification Search
CPC ........ A61G 5/006; A61G 7/015; A61G 7/018; A61G 5/1059; A61G 7/02; A61G 5/1062; A61G 5/125; A61G 7/1011; A61G 7/1032; A61G 7/1019; A61G 5/04; A61G 7/1059; A61G 7/1048; A61G 7/1046; A61G 2200/34; A61G 3/063; A61G 5/104; A61G 5/1013; A61G 5/1067; A61G 5/1075; A61G 7/165; A61G 7/1067; A61G 5/14; A61G 7/1092; B60G 1/04; B60G 2204/421; B60G 2300/07; B60G 2300/32; B60G 2300/24; B60G 2300/40; A47C 17/162; A47C 3/20; A47C 3/40; A47C 7/506
USPC .... 297/344.12, 118, 344.15, 344.16, 344.17, 297/344.2; 5/81.1 R, 65.1, 81.1 HS, 11
See application file for complete search history.

(56) References Cited

U.S. PATENT DOCUMENTS

2020/0171903 A1 * 6/2020 Rohde ...................... B60G 1/04

FOREIGN PATENT DOCUMENTS

EP 2712597 A2 * 4/2014 ............... A61G 7/16

* cited by examiner

*Primary Examiner* — Madison Emanski
(74) *Attorney, Agent, or Firm* — Olivo IP Law Group, P.C.; John W. Olivo, Jr.

(57) ABSTRACT

The disclosed device is a wheelchair that is capable of being converted into a bed and visa versa. The device is also able to transfer patients from it unto another surface, such as a bed or an examination table. The device may be used as a rescue apparatus to lift patients that fell on the ground. The mobility device may additionally have hygienic openings to enable a rider to relieve him or herself without needing to be lifted or transferred off the mobility device. The device is fully motorized, with all functions capable of being performed at the touch of a button.

19 Claims, 20 Drawing Sheets

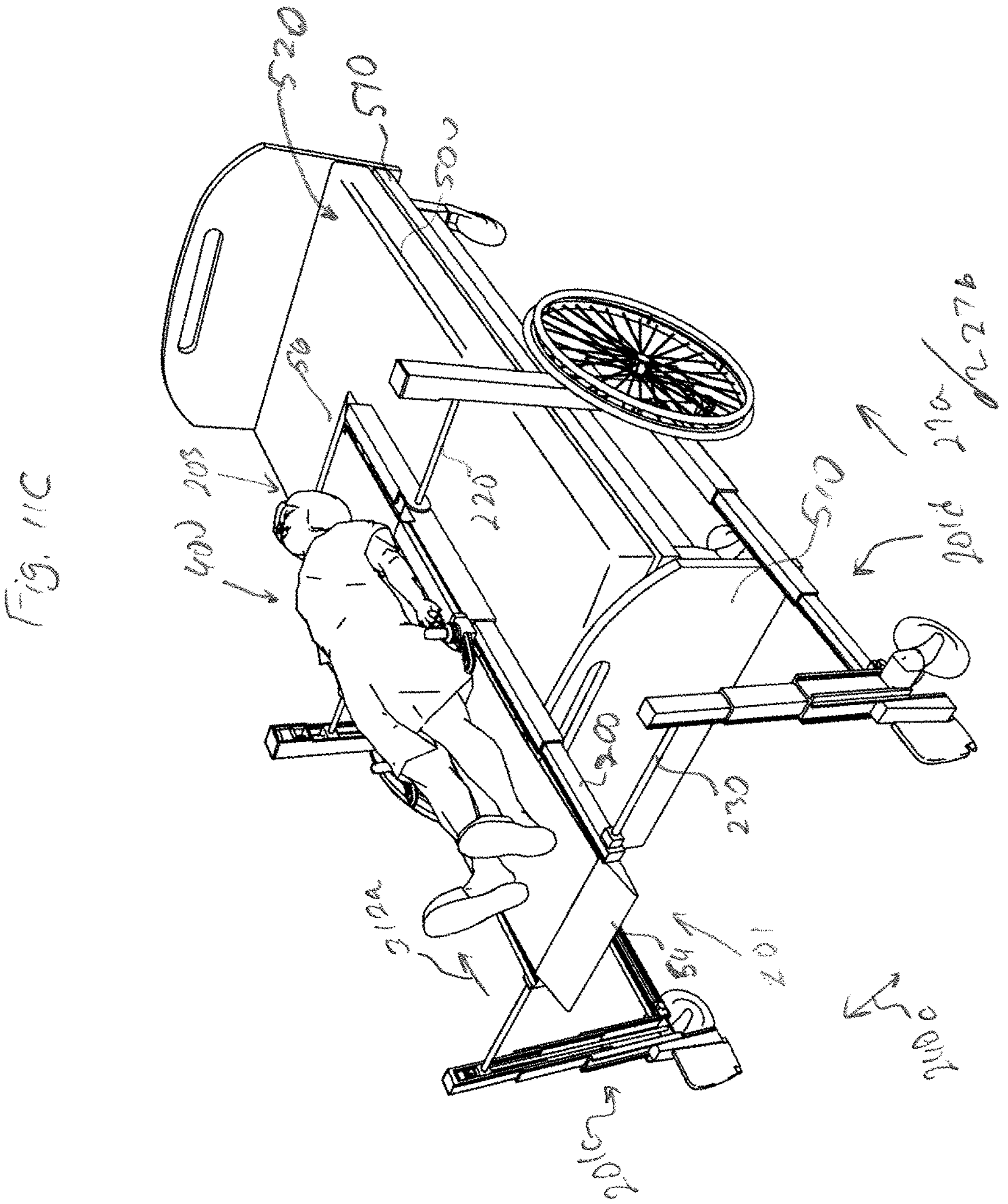

Fig. 15 converting the mobility device 10 into a flat surface 670

↓

Figure 15:
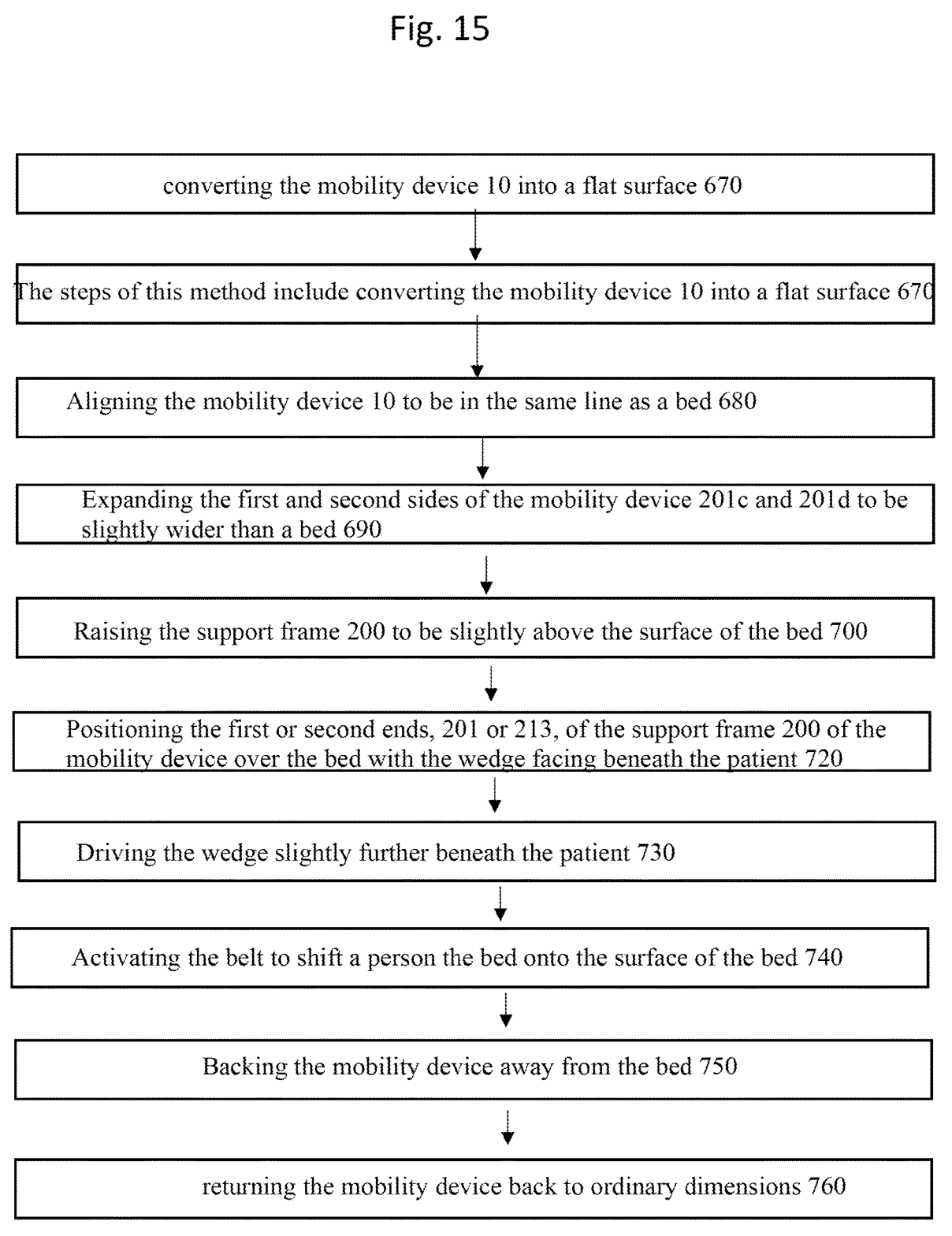

The steps of this method include converting the mobility device 10 into a flat surface 670

↓

Aligning the mobility device 10 to be in the same line as a bed 680

↓

Expanding the first and second sides of the mobility device 201c and 201d to be slightly wider than a bed 690

↓

Raising the support frame 200 to be slightly above the surface of the bed 700

↓

Positioning the first or second ends, 201 or 213, of the support frame 200 of the mobility device over the bed with the wedge facing beneath the patient 720

↓

Driving the wedge slightly further beneath the patient 730

↓

Activating the belt to shift a person the bed onto the surface of the bed 740

↓

Backing the mobility device away from the bed 750

↓ returning the mobility device back to ordinary dimensions 760

Fig. 16

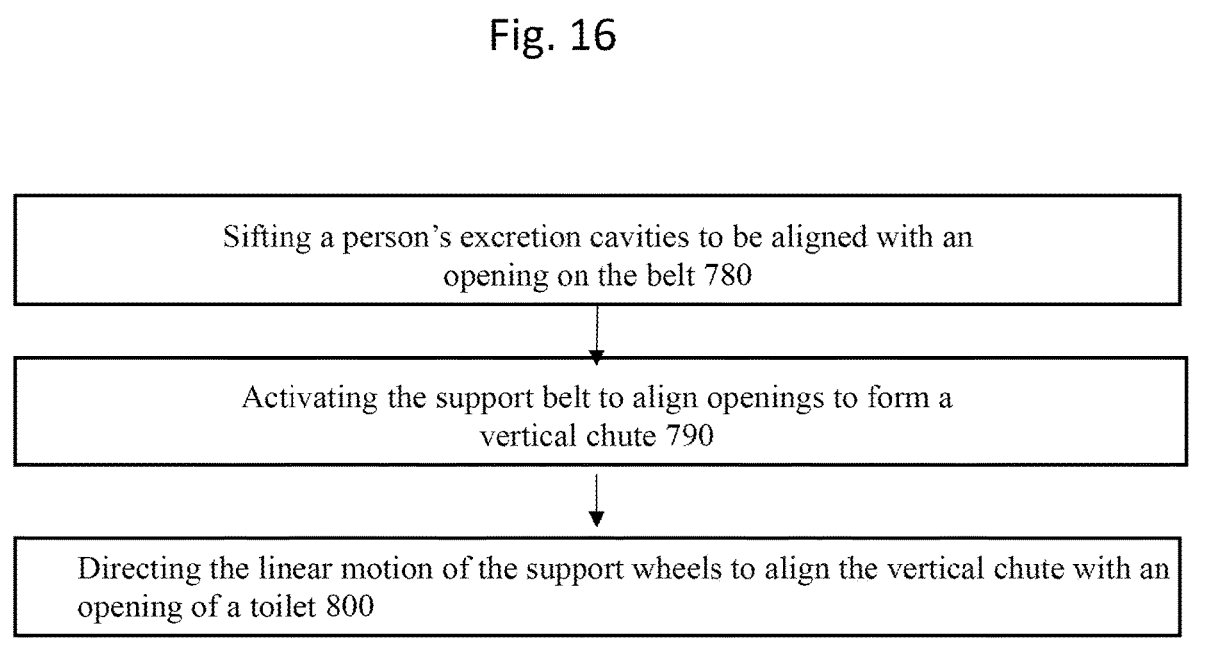

Sifting a person's excretion cavities to be aligned with an opening on the belt 780

↓

Activating the support belt to align openings to form a vertical chute 790

↓

Directing the linear motion of the support wheels to align the vertical chute with an opening of a toilet 800

CHAIR AND BED MOBILITY APPARATUS

FIELD OF THE INVENTION

The present invention relates to mobility apparatuses, namely, wheelchairs, for use in a medical and maintenance applications of injured or disabled human users.

BACKGROUND OF THE INVENTION

Those who are unable to walk or get out of bed are presently forced to adapt to a world intended for competent human beings. Ordinary activities that are taken for granted by healthy individuals are extremely challenging to those lacking certain motor skills, or for those unable to walk or stand without assistance. A plethora of devices have been introduced over the years to assist with various types of disabilities. However, all of these devices remain very narrowly focused. Therefore, a simple trip to the lavatory or from a hospital bed to a doctor's office in the same hospital, or even the same floor of a hospital, requires the use of several unwieldy and expensive devices. Additionally, these devices usually require operator's input to fulfill their purpose. The ongoing need for disabled device operators significantly increases the cost of care for the disabled and continues to be a source of major embarrassment and inconvenience to the invalid and his/her family.

Getting up for such individuals usually means utilizing a special hoist to lift the individual off a bed and load him/or her into a chair or another type of mobility device. Once this individual gets to his/her destination, the hoist is again used to lift the individual out of the mobility device and onto a bed, an examination table or toilet. The need to be lifted and transferred from and to different locations and surfaces represents an enormous commitment and hassle to the disabled and their families, not to mention the tremendous cost and space taken up by the required equipment.

Many companies and former patients are busy designing various machines and adaptations intended to improve the care and quality of life for the disabled. However, these adaptations remain very narrowly construed and are intended to resolve one issue or situation and then rely on existing devices to fulfill other roles. These solutions may actually exacerbate the ongoing issue of multiple chains of transfer and mobility devices. For example, a wheelchair was invented to replace the legs. A hoist was developed to transfer the induvial from a bed to a chair and back. Hoists have become highly specialized. For example, a poolside hoist versus a bedside hoist versus a car or stair lift. A bed capable of being raised and lowered and wheeled about was created to provide enhanced comfort for those who are no longer able to shift in bed on their own, but the same individuals still need to use a hoist and a wheelchair.

Ultimately, disabled individuals still require assistance from family, friends and hired professionals to survive. But even individuals who are able to get around, but who have compromised mobility levels due to a disability or old age, must still remain under constant observation as the risk of falling can result in a catastrophic inability to get up. The risk of inability to safely get out of bed will force the individuals to remain in bed and be forced to soil themselves and develop bedsores and other issues. It therefore most fitting that the art of mobility devices begin to develop automated, robotically enabled devices that fulfill multiple roles, such as a wheelchair that can lift a person off the floor with a touch of a button or voice operated commands, and then transfer the person into and out of a bed.

SUMMARY OF THE INVENTION

The current application discloses a mobility device having a pair of first struts, each strut being a substantially upright component. Each one of the first struts being in a parallel and set apart association with each other. Each of the first struts having a main wheel attached along the side of the outer side of the strut. It is preferable that the main wheel is attached to a wheel motor that provides independent locomotion to each of the main wheels. The main wheel is the primary weight bearing wheel of the apparatus, supporting the strut to which it is rotatingly connected on a support surface, such as the floor or the ground.

The disclosed mobility device further comprises a pair of second struts. These are also substantially upright components that are a parallel and set apart association with each other. Each of the second struts having a wheel attached. The wheel supporting each of the second struts on a support surface. The wheel attaching to the second strut may be mounted to the external side of each of the second strut, facing outward from the mobility device. The wheel may also be mounted at the bottom end of each second strut as shown in the figures. Mounting such wheel at the bottom end is best suited to house a coaster type wheel with a 360° rotation. It is preferred that the steering of the two wheels, attaching to each of the second struts, is motorized and controllable remotely by a joystick, verbal or retinal commands, with each steering wheel working in parallel with the other steering wheel.

The pair of first struts and the pair of second struts are in a parallel and set apart association with each other and connected by at least two ties, preferably one tie to a first and second strut pairing. One end of each such tie connects to one of the struts of the first pair of struts, and the other end of each such tie connects to one strut of the second pair of struts. With struts so connected by one tie being on the same side of the mobility device. The other or second tie would connect the other strut of the first pair of struts to the other strut of the second pair of struts. Each tie being in a parallel and set apart association from each other. With each such tie and strut pairing forming one lengthwise side.

Notably, it is preferred that at least the second pair of struts is comprised of hollow enclosed or semi-enclosed telescoping components. The first pair of struts may also be comprised of hollow enclosed or semi-enclosed telescoping components. Alternatively, the first pair of struts is comprised of one main rail. The one main rail concealing an actuator that enables the raising and lowering of the first main axle, and the raising and the lowering of the lower set of wheels. Furthermore, both of ties of the at least two ties are preferably comprised of telescoping components that are fully enclosed or semi-enclosed. The telescoping components of each tie are fully parallel to each other and are intended to extend the mobility device, setting the first and second pairs of struts further apart lengthwise.

The disclosed mobility device further comprises a support frame which is mounted on the first and second pairs of struts. The frame is attached to the struts through an actuator at least in one of the two struts in each pair. This type of connection enables the support frame to travel up and down the first and second pairs of struts so as to be lowered to the floor or to be higher than a standard or hospital bed.

The support frame is comprised of a first plurality of frame components and a second plurality of frame components. The first and second pluralities of frame components are in a parallel and spaced apart association with each other. The first and second pluralities of frame components are essentially two rail members running parallelly and opposite to each other. Each rail forming a plurality of frame components is comprised of a first frame component, at least one forward frame component placed forward of the first frame component, and at least one at least one rear frame component placed aft of the first frame component. All frame components between the two pluralities of frame components, or two rails, are in parallel to each other.

Each frame component is has a first end and a second end. The first end of each frame component contains a rotatable joint that is connected to a rotatable joint via an axle to the first end of the parallel frame component on the opposing rail. The second end of each frame component is in a slidable telescoping association with components that are forward of art of it. The second end of the forward most frame component contains a forward most axle which is the second main axle.

As stated previously, secondary frame components are located aft of the first frame component, where a proximal end of the rear frame component connects to the first end of the first frame component through a hinge. Preferably the first main axle fulfills the role of a hinge. The rear frame component of both the first and second pluralities of frame components further comprise at least one secondary frame component extending rearward from the first pair of struts. The second end of each rear component is preferably in a slided telescoping associated with the next secondary frame component, with the second or distal end of the rearmost secondary component connected through a secondary axle to the second end of the rearmost secondary component of the opposite plurality of frame components.

The hinge connecting the first end of the first frame components with the proximal end of the rear frame components is also an axle. However, this axle extends beyond the two rails forming a support frame. Each end of this axle is housed within a strut of the first pair of struts. The frontmost axle, which is the axle connecting the second end of the frontmost forward frame component forms the second main axle, with either end of the second main axle mounting within one of the second pair of struts Each of the axles contains either a roller or a roller wheel or both. The axle forming the second main axle, and the secondary axle (rearmost axle) preferably contain both a roller wheel and a roller. A moving belt loops around the support frame lengthwise from the frontmost pivot to the secondary axle in the rear, passing beneath a retention bar at the first main axle or first pivot. At least the front and rear rollers are both oscillatingly actuated with an electric motor that can be controlled remotely, and with a touch of a button are able to displace the belt either forward or backwards along a continuous loop between the forward rollers and the rear rollers.

The support frame further comprises a first linear actuator and a second linear actuator. The first linear actuator is mounted at the first frame component. It contains a first forward actuating arm that is made solely from a stroke rod of the actuator, or which encases the stoke rod within several telescoping components. The front most end of the forward actuating arm is mounted around the second main axle. In this configuration, the first linear actuator is configured to lengthen or shorten a portion of the support frame that forms the wheelchair seat.

A second linear actuator mounted at the rear frame component. The second linear actuator having a rearward actuating arm, which is comprised entirely of the stroke arm of the second linear actuator or a several telescoping components around the stroke arm. The distal end of the rearward actuating arm is connected through a rotating association to the secondary axle with the second linear actuator configured to shorten and lengthen the second of the support frame forming a back of the wheelchair. Appreciably, the first and second linear actuators can be controlled through one or more control joysticks mounted into the armrests of the first and second pluralities of frame components.

It should be noted further, that the belt does not extend. Therefore, the first and second linear actuator operate in unison and in reverse of each other. Thus, when the first linear actuator is extending, the second linear actuator is retracting and visa versa.

The first and second linear actuators work with the first pivot to convert the mobility device into a flat bed and back into a wheelchair. To illustrate this, picture the support frame as forming a back and a seat of a chair. The first linear actuator is then directed to extend, which simultaneously forces the second linear actuator to retract, which simultaneously cases the pivot to begin to increase the angle between the first frame components and the rear frame components to increase, which simultaneously causes the front and rear rollers to rotated forwardly causing the belt to be displaced int a forward direction, moving a person supporting by the bed downward and unto the now extending at least one forward frame members. To convert the device back into a chair, the reverse process takes place. The second linear actuator is directed to extend the rearward actuator arm and the first linear actuator is directed to retract the forward actuator arm. The hinge connecting the first frame components and the rear components begins to reduce the angle between the first frame components and the rear frame components and the first and second rollers begin to rotate backward to transfer a person resting on the forward frame components back to being supported by the first frame component and the rear and secondary frame components. The maximum angle between the first and rear frame components is preferably 180°, with the minimum angle being 90° or slightly less.

The first pair of struts further comprises at least one first vertical actuator. The first vertical actuator mounted at one of the struts of the first pair of support struts and connecting at or near one of the ends of the first main axle. If another first vertical actuator exists, it is connected at or near the second end of the main axle, otherwise, the end of the main axle not connecting to a first vertical actuator is mounted inside a moving support component, which is configured to be displaced upward or downward along the strut of the first pair of struts. The first vertical actuators are configured to move the first main axle up and down, thus raising or lowering the first end of the support frame.

The second pair of struts further comprises at least one second vertical actuator. The at least one second vertical actuator is mounted to one or both of the struts of the second pair of struts and houses an end of the second main axle in a rotating joint. The raising and lowering of the second support actuator causes the second main axle to be raised and lowered, causing the second end of the support frame to be raised and lowered.

While the second vertical actuator may also serve to extend and collapse the telescoping sections of the struts forming the second pair of struts, a third vertical actuator may be dedicated to extending and collapsing the struts of the second pair of struts. The third vertical actuator would preferably be mounted at the tie connecting the struts of the first and second pair of struts, with the top of the third vertical actuator connecting with the top of the strut of the second pair of struts.

Additionally, its preferred that the first and second main axle each have at least one side actuator. In this configuration, the stroke rod of the side actuator would also serve as the axle. Alternatively, the main axle is split into at least two separate axle components. With each axle component connecting with a side actuator or with the side actuator's stroke rod forming the axle component.

As mentioned previously the front most axle or axle components further comprises one or more roller or rotating drum. The rotating drum is electronically actuated to rotate clockwise and counterclockwise. The electric motor for the drum may be located on the axle or on mounted on the forward most frame component. Similarly, the secondary axle also comprises at least one drum roller. This rear drum roller is also configured to rotate clockwise and counterclockwise. It is preferably that the front and back drum rollers work in together an in parallel to displace the belt linearly in a desired location along the support frame.

Additionally, it is highly preferable that both the second and first ends of the support frame further comprise a wedge device. One or several wedges are preferably rotatingly deployed on the second main axle (second pivot). The base of the wedge is substantially adjacent to the second pivot with the ridge of the wedge extending forwardly away from the wedge. The base of the wedge preferably instrumented to rotate about the second pivot and controlled remotely from the joystick control center. The purpose of the wedge is to assist with raising of a person of a floor or a bed surface. The process would be to drive the mobility device towards a person, with first main mails mounted at the first pair of struts providing the linear mobility and the second wheels mounted at the second pair of struts providing the steering. Thus moving, the mobility device would position the second end of the frame to be at the head or at base of the feet of a person. The second main axle is then lowered until the surface of the floor or bed, or as low as the components of the mobility device allow. At this point the ridge of the wedge should be substantially level with the surface of the floor or bed and just below the head or legs, whatever the case may be. The first main wheels then inch towards the person gradually driving the wedge beneath the person. If necessary, the wedge should be mildly wiggled driving the wedge further beneath the person. At that point the belt can be triggered backward to pull the person unto the belt. The bed to chair conversion described above, can then be used to switch a person who was lifted off the floor into a sitting position.

The mobility device is further comprised of retractable arm rests and folding footrests. The retractable arm rests may exist at the minimum at the first frame components and may deployed by lifting the arms upwards, on holding support arms. The arm rests further feature at least one removable joystick for controlling the forward back motion of the device, steering, chair to bed conversion and visa versa.

Just it is important to have a mobility device that can be called upon to lift a person off the ground, it is of equal or greater importance to be able to transfer a person from the mobility device and unto a bed and from a bed back onto the mobility device. Once on the mobility device, the person can transport him or herself using the automated propulsion and using a joystick to steer.

On arriving at a bed, the mobility device is configured to deposit a person directly onto a bed or remove a person from the surface of the bed. First, the device is propelled to be in the same line as the bed where either the first or the second ends of the support frame parallel with the foot of the bed. The first pair of struts is further comprised of a lower actuator in each of the struts. The lower actuator lowers the lower support member of each strut, which may be the stroke arm of the lower actuator. Mounted at the bottom end of the lower support member are coaster wheels, which are configured to come into contact with the ground and eventually raise each of the first main mail off the ground. The coaster wheels at bottom end of the lower support member may have a wheel that is able to spin in 360° or is simply oriented perpendicularly to the first main wheel and the direction of the sidelong motion of the two sides of the mobility device. Similarly, the second main wheels of the second pair of struts is able to position itself in line with the sidelong movement of the two sides.

Once the first main wheels are off the ground the side actuators in the first and second axles begin extending their stroke arms, extending the first and/or second sides away from the support frame, causing the mobility device to become wider. Preferably, the extent of the widthwise expansion of the mobility device should be greater than that of a standard hospital bed. Once the struts with their connecting ties have been sufficiently widened the support frame is raised to be higher than the surface of the bed. The mobility device is then propelled to position the support frame over the bed. This is done by either raising the lower support members until the first main wheels can engage with the ground or having the lower wheels with the ability to steer, and these can then be aligned to face the direction of the motion of the mobility device, and these wheels can then propel the mobility device over a bed. At this point the end of the support frame overlapping with the bed is lowered until it is at the same level or pressing on the surface of a bed. The mobility device is then inched forward until the wedge slides beneath a patient and the belt is then engaged and begins to tug the patient onto a the support frame, or alternatively, the belt is propelled to drive the person over the wedge and back onto a bed over a wedge. It should be noted that preferably the secondary axle further pivotally mounts a second wedge having the base of the wedge adjacent to the secondary axle and the ridge of the second wedge away from the secondary axle.

Finally, an additional feature that may be integrated into the mobility device is to enable a rider to utilize a conventional toilet. In this embodiment the first linear actuator contains an opening. The belt contains two openings that are configured to be rotated into alignment with the opening in the first actuator, leaving an unobstructed aperture. The mobility device is then propelled over a conventional toilet, and the first and second main axles lowered to sufficiently lower the support frame to be just above the rim of a toilet. The rider can then relieve him or herself without the need to stand up or be hoisted onto the toilet.

1. It the object of the disclosed invention to create a device capable of automated linear propulsion and steering.

2. It is another object of the disclosed device to create a remotely steered mobility device.

3. It is still another object of the present device to create a device capable of converting from a chair to a bed and back, without removing the rider.

4. It is still another object of the disclosed device to enable a support frame that can be raised and lowered substantially to the ground and raised above a conventional bed.

5. It is yet another object of the disclosed device to create a device capable of lifting a person off the ground and onto the device without assistance or intervention by another machine or human.

6. It is still another object of the present invention to disclose a method in which the disclosed device that is able to utilize either its front end or its back end, to load and off load a person from and to a bed.

7. It is still another object of the present invention to permit a rider to utilize a conventional toilet to relieve him or herself without getting off the device.

BRIEF DESCRIPTION OF THE DRAWINGS

FIGS. 11A-11D demonstrate the various contextual uses of the device in transferring a user from another surface onto the disclosed device and from the disclosed device unto a surface.

FIGS. 13-16 are diagrams describing the disclosed method.

DESCRIPTION OF THE PREFERRED EMBODIMENTS

Figure 1:
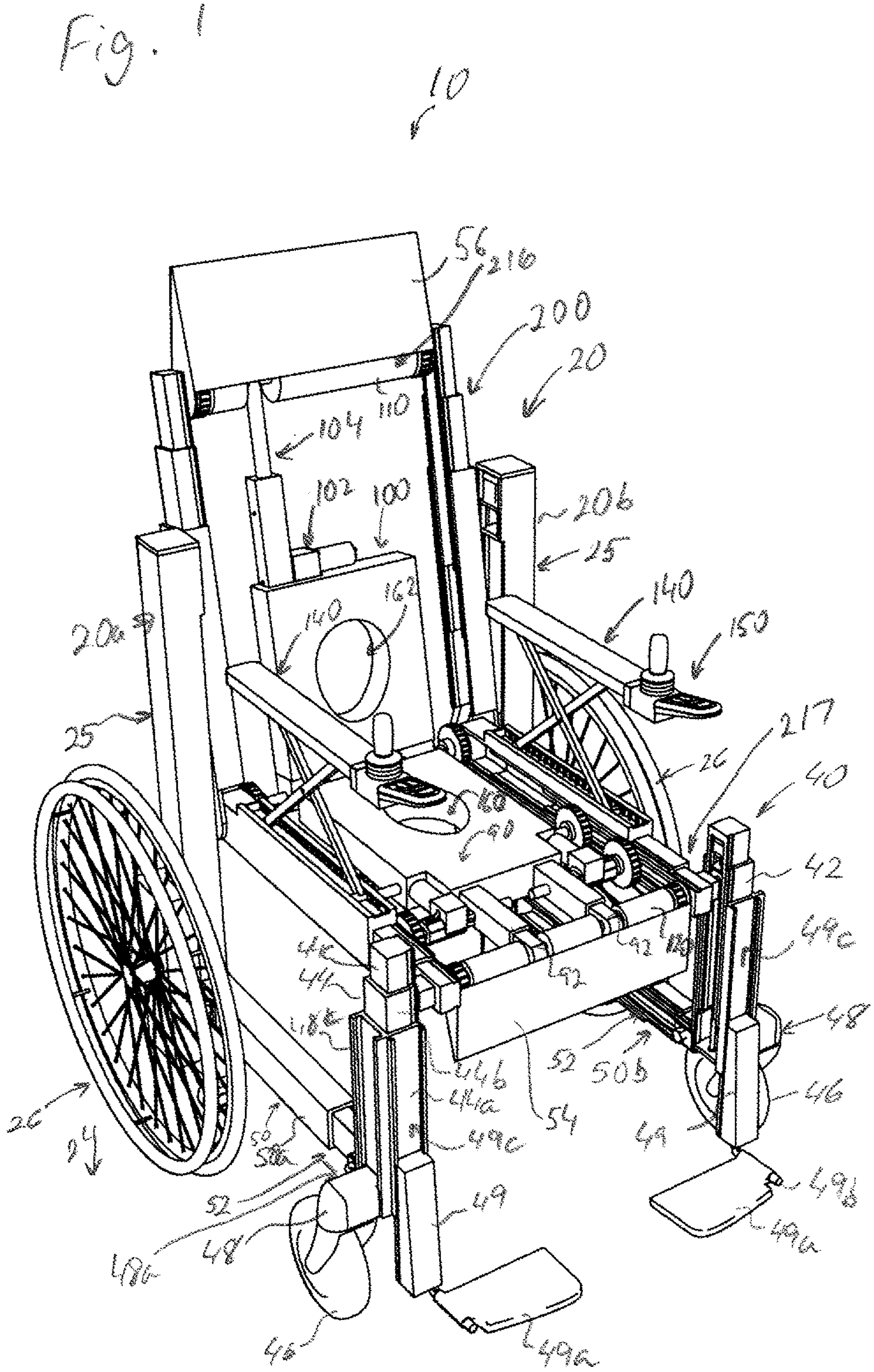
FIG. 1 is a perspective view of the disclosed device shown with a belt.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 demonstrates the first pair of struts 20 comprised. Mounted unto the outer side 25 of each of the struts 20 is the first wheel 26 that supports the first pair of struts 20 on the ground 24 or any other support surface. A second pair of struts 40 is in a parallel and spaced apart association with the first pair of struts 20. The second pair of struts 40 is comprised of struts 42 and 44 and the telescoping components of the struts 44*a*, 44*b* and 44*c*. The second wheels 46 are mounted toward the bottom end 48*a* of the struts within a pair of rails 48*d*, which permit the actual mount of the second wheel 46 to be adjustable and to slide upwards to bring the supports struts 40 substantially in connection with the support surface 24. Also shown are the folding foot supports 49*a* that swing on pivots 49*b*, the foot supports are mounted onto housings 49, which in turn are mounted within the mounting grooves 49*c* on the lower strut component 44*a*.

Also visible is the first actuator 90 within the support frame 200. The first actuator 90 is shown with two forward actuator arms 92. The second linear actuator 100 with the forward actuator arm 104. The first and second linear actuators 90 and 100, respectively are shown with center apertures to support use of the mobility device 10 with a conventional bathroom.

Separating the first pair of struts 20 and the second pair of struts is at least two ties 50. The first tie 50*a* of the at least two ties 50 connects one of the first upright struts 20*a* with one of the struts 44 of the second pair of struts 40. The other strut 50*b* of the at least two struts connects the other of the first pair of struts 20*b* with the other of the second pair of struts 42. The ties 50 are formed with at least one additional telescoping component to extend or reduce the distance between the first and second pair of struts 20 and 40. The first pair of struts 20, the second pair of struts 40 and the ties 50 are shown as hollow semi enclosed members. Alternatively, the members may be fully enclosed.

Also visible is first wedge 54 pivotedly attached to the second axle 217 and pivoted downward as shown, and the second wedge 56 pivotedly attached at the secondary axle 216. The first and second wedges 54 and 56 pivot around the secondary acle 216 and the second main axle 217 with the ridge 53 pointing in the direction away from the secondary axle 216 or the forwardmost axle 217.

Figure 2:
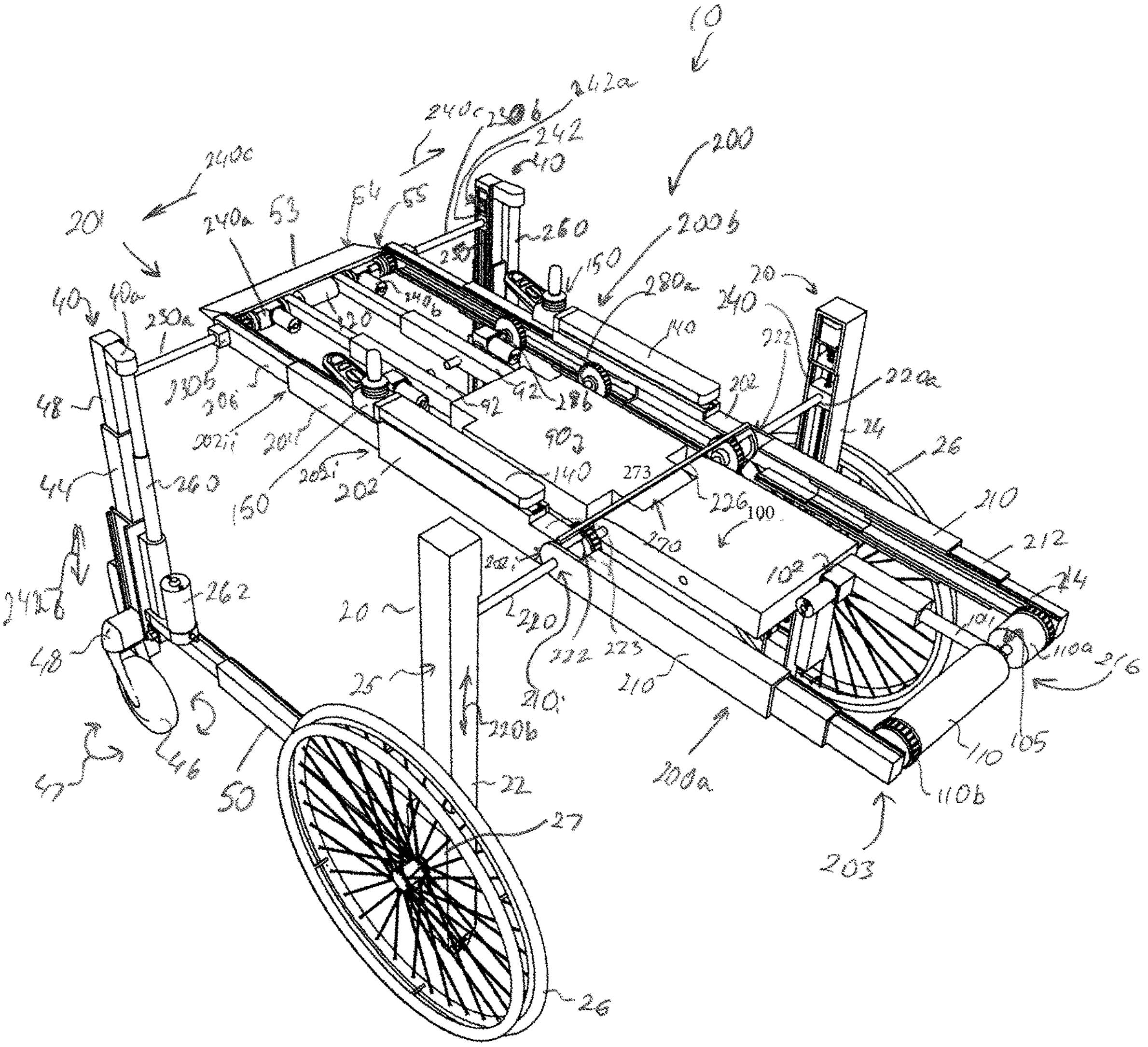
FIG. 2 is a perspective view of the disclosed device shown in FIG. 1 converted into a bed.

FIG. 2 demonstrates the support frame 200 comprised of the first plurality of frame components 200*a* and the second plurality of frame components 200*b*. The first and second plurality of frame components 200*a* and 200*b* respectively, are in a parallel and spaced apart association with each other and jointed together by a plurality of axles, which at the minimum include the first main axle 220, the second main axle 230 and the secondary axle 216. Each of the first and second plurality of frame components 200*a* and 200*b* is comprised of the first frame member 202 and at least one forward support member 204 and 204 that are forward of the first frame support component 202, and a rear frame support member 210 that is after of the first frame support member 202. Each rear frame support member 210 is preferably further comprised of at least one secondary support member 212. Each of the first frame support member 202 and at least one forward support members 204 and 208 are comprised of the first end 202*i* and the second end 202*ii*. The first end 202*i* is comprised of an axle, such as the first main axle 220, and the midsection axles 280*a* and 280*b*. The second ends 202*ii* are in a telescoping and slided association with the frame component ahead of it. The second end 202*ii* of the frontmost frame component 208 is comprised of the second main axle 230 which connects to the axle components 230*a* and 230*b* via rotating joints 230*b*. The second main axle 230 is shown having two side actuators 240*a* and 240*b*. Therefore, while the first axle 230 is shown as fully extended in a sidelong direction 240*c*, the one or both of the axles 230*a* or 230*b* may be extended obliquely.

Still referring to FIG. 2, the proximal end 210 of the rear member 210 is connected to the first end 202*i* of the first frame member 202 through a hinge 222. The first main axle 220 provides the hinge or pivot that enables the first frame component 202 and the rear component 210 to change the angle 223. The pivot actuator 270 automates the angle 223 and enables it to be varied at a touch of a button. The first linear actuator 90 is mounted to a first frame component 202, with the forward actuating arm 92 extending to the foremost forward frame member 206 and connects in a rotational fashion to the second main axle 230. In this association the forward actuating arm, which may be the stroke arm of the first linear actuator 90, is capable of pulling or pushing on the second main axle 230, without preventing the axle 230 from rotating, if such rotation is required or preferred. Visible above the first frame components 202 are retracted arm rests 140 having one or more joysticks 150 for controlling the linear motion, steering and various linear actuators disclosed in the mobility device 10. Controls for moving the first and second rollers 120 and 110 respectively, are then exposed to the rider at one or both joysticks 150. It should be noted that while controls may be transmitted to toggle and pushbutton switches, control can also be verbal, where a concealed microphone in one of the components of the frame 200 will be interpreted by an onboard control center to execute a relevant command, such as "chair forward", "steer left" or "steer right" and so forth.

The rear frame component 210 is shown having at least one secondary component 212 and 214 which is in a slided telescoping relationship with each other. The seatback component 100 is connected to the pivot component 270. The pivot component 270 articulates the back component 100, causing the angle 230 to be increased or decreased.

The second linear actuator 102 is shown mounted onto a seat back component 100. The second linear actuator 102 has a rearwardly extending arm 104, with the rearmost or distal end 105 rotatingly coupling with the secondary axle 216. The rearwardly extending arm 104 is configured to extend and compress the telescoping components rear frame component 210 and at least one secondary frame component 212 and 214 of the first and second plurality of frame components 200*a* and 200*b* respectively. While second linear actuator 102 is shown mounted on the seatback 100 is may also be mounted on one or both of the rear frame components 210.

The secondary axle 216 represents the second end 203 of the support frame 200. The secondary axle 216 is preferably encased within the second roller 110. The second roller 110 may be a single unit or comprised of several interrupted units, as shown in rollers 110 and 110*a*. The second roller 110 is motorized to rotate clockwise or counterclockwise in parallel with the first roller 120. The motor for rotating the second roller 110 is preferably mounted onto the secondary axle 216, or at the distal end 214. Additionally, the roller 110 may contain a roller wheel 110*b* on either of its ends the purpose of roller 110 and roller wheel 110*b* is to enhance the coupling with the belt 300. The first roller 120 encases the second axle 230 and is motorized clockwise or counterclockwise in a synchronized manner with the second roller 110.

Also visible in FIG. 2 is the first vertical actuator 240 that moves axle joint 220*a* in the direction 220*b*, the axle joint 220*a* rotatingly houses the first main axle 220. The first vertical actuator 240 may be installed in one or both of the struts of the first pair of struts. A second vertical actuator is 242 is preferably deployed within one or both of the struts of the second pair of struts 40. The second vertical actuator 242 is configured to raise and lower the second axle joint 242*a* that are rotatingly holding the second main axle 230, in the direction 242*b*. The second vertical actuator 242 may also expand and collapse the telescoping sections of the strats of the second pair of struts 40. Alternatively, a third vertical actuator may be mounted onto a tie 50, with the distal end of the stroke arm 260 mounting on at the distal end 40*a* located at or near the top of the second pair of support struts 40.

Each of the first wheels 26 connects to the exterior portion of the second pair of struts 20 through an electric motor 27. There is an electric motor 27 at each of the first wheels 26. The second wheels 46 are preferably coaster wheels and connect through a motor mount 48, which enables the second wheels 46 to be steered in 360° angle. The electric motors 27 to control forward and reverse motion of the mobility device 10 and the motor mount 48 to control the steering of the mobility device 10 would be presented to the rider via a removable joystick 150.

Figure 3:
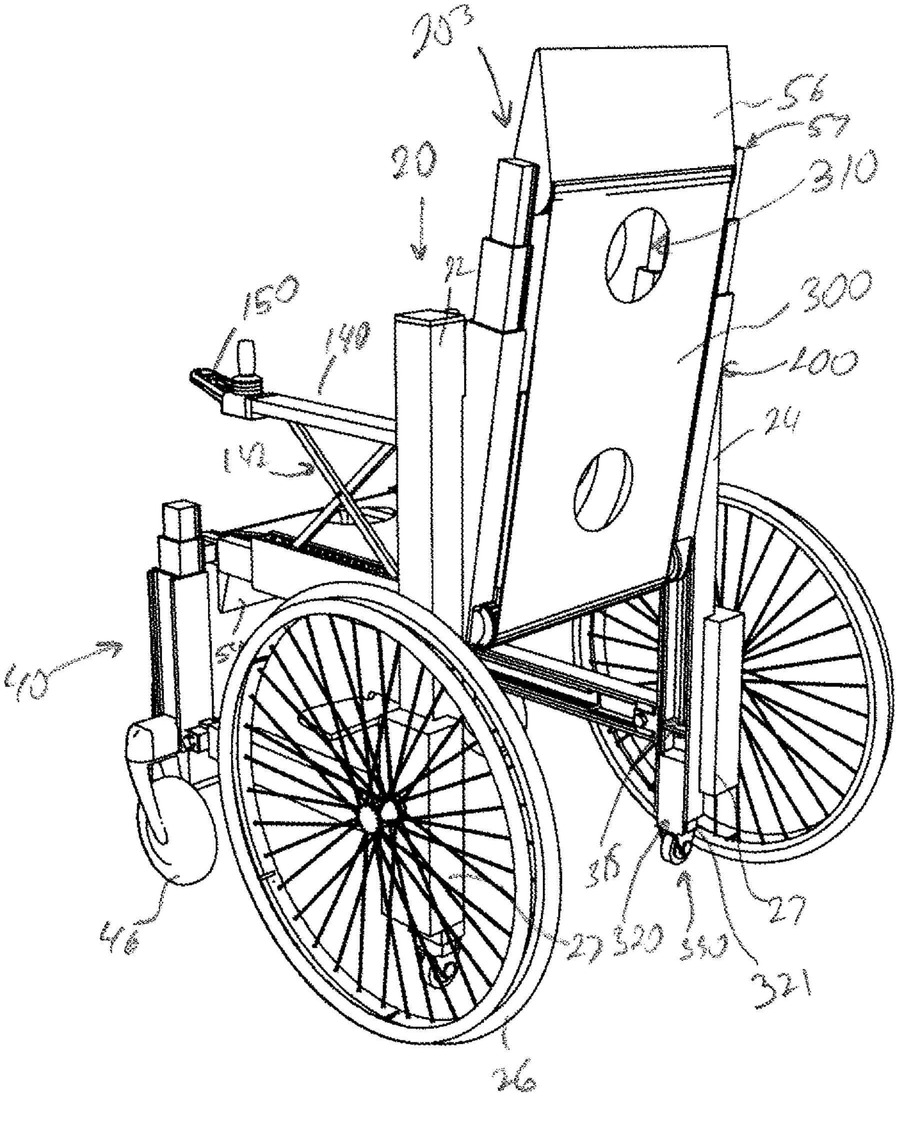
FIG. 3 is a view of the device from the rear and having toilet compatibility openings.

FIG. 3 demonstrated another embodiment of the disclosed invention. Shown is the backside of the support frame 200. The belt 300 is shown having openings 310. Note that the belt 300 may have a plurality of openings 310 to maximize the ability to match such openings to the openings 160 in the seat actuator 90 (FIG. 1). Also visible in FIG. 3 is the second wedge 56 mounted at the second end 203. The second wedge 56 pivots using the secondary axle 216 (FIG. 2).

FIG. 3 demonstrates the wheel motor 27 that provides propulsion to the first wheels 26. The wheel motors 27 may also contain a battery pack to power other electronic features of the mobility device, and further comprise utility ports, such as a charging port.

The first pair of struts 20 is further comprised of the lower actuators 315 that are configured to extend and retract the lower support members 320. Each lower support member 320 contains a support wheel 330 located at its lowest end 321. The support wheels 330 are preferably perpendicularly oriented to the axis of oscillation of the first wheels 26. Alternatively, the support wheels 330 may be connected to a motor at the lower end 321 which would provide power steering of the wheel mount and the linear motion of the support wheels 330.

Figure 4:
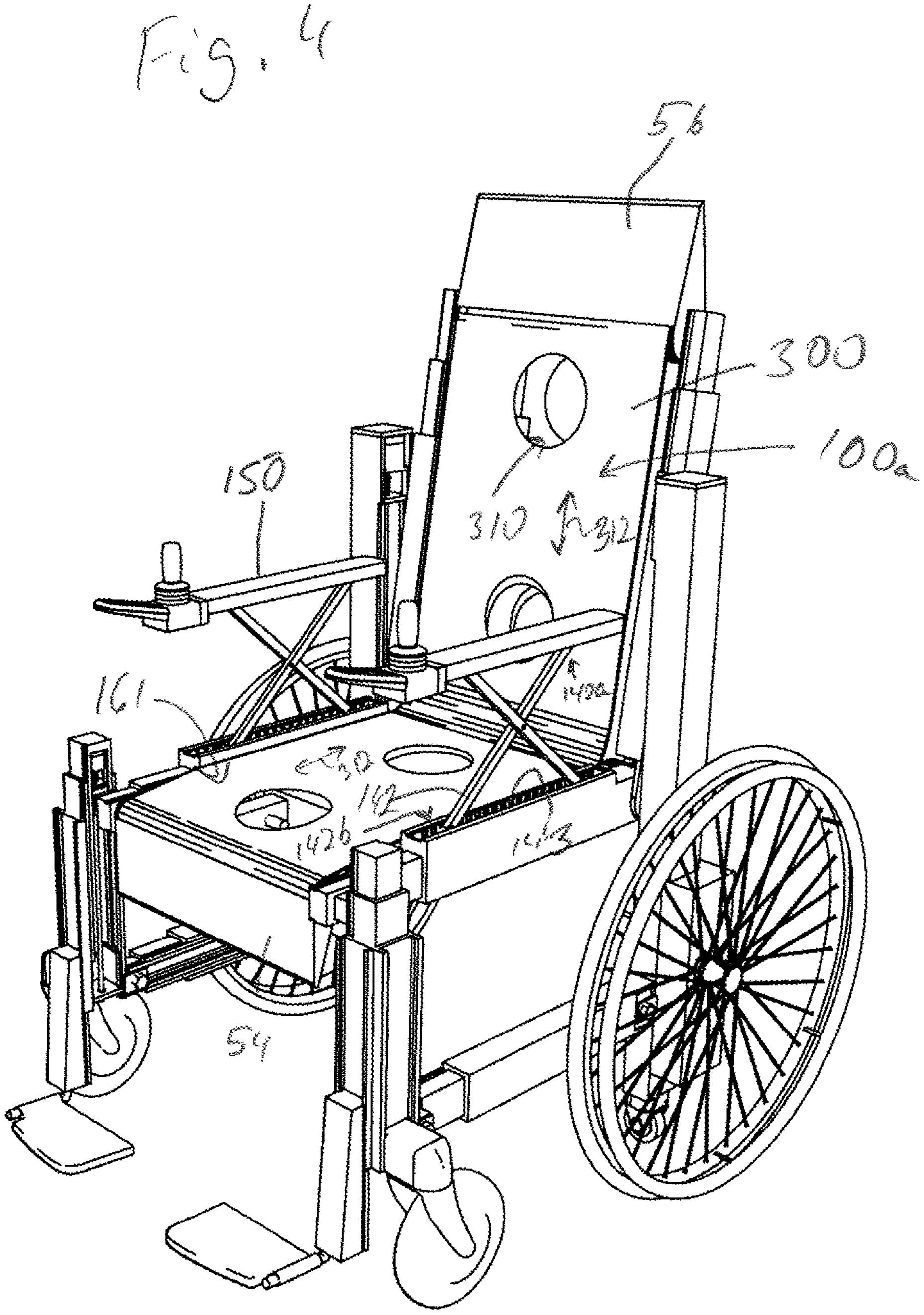
FIG. 4 is a frontal view of the device shown in FIG. 3.
Figure 5:
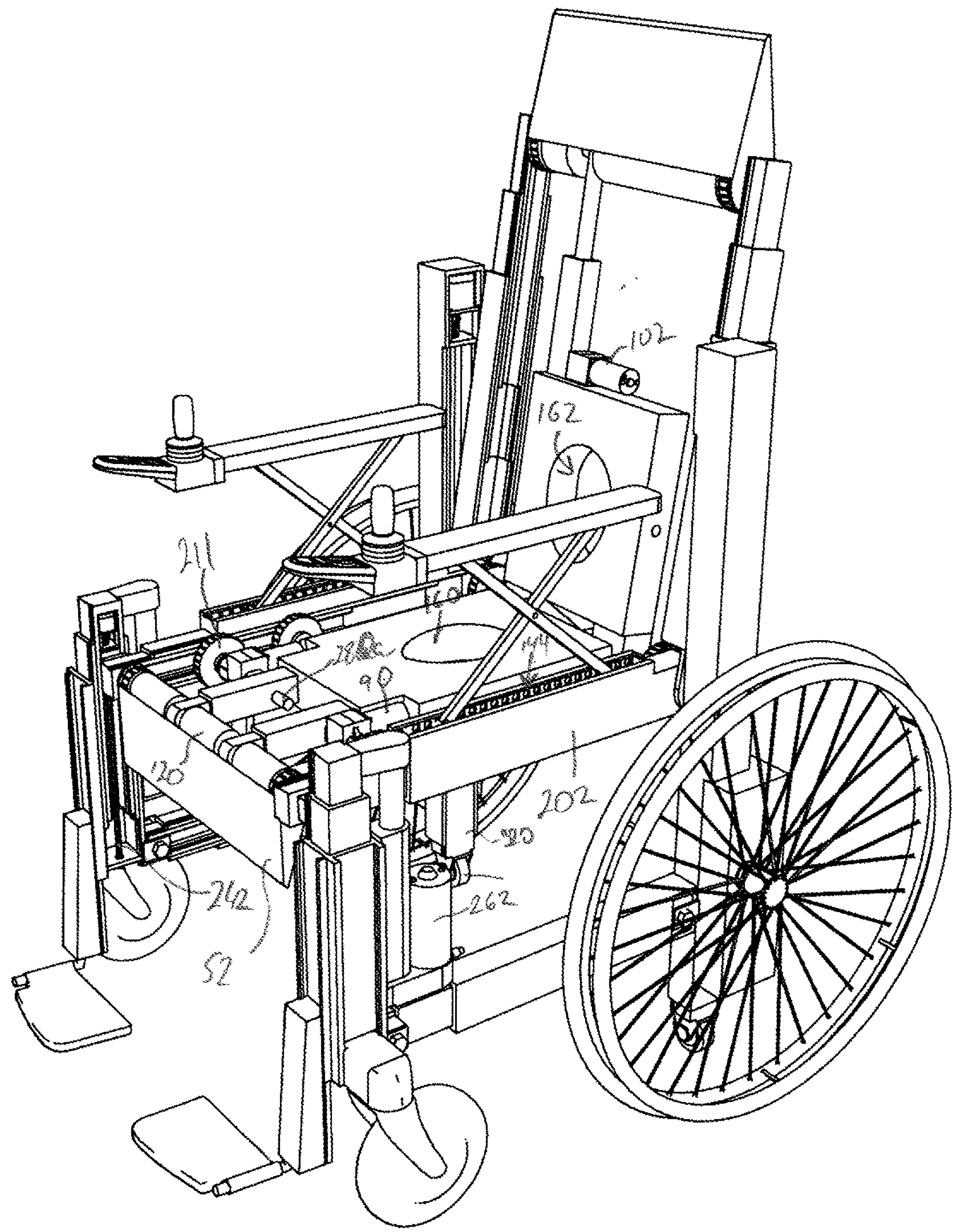
FIG. 5 is a device shown in FIG. 4, but without a belt.

The front of the mobility device is further demonstrated in FIGS. 4 and 5. Shown are a plurality of openings 310 in the belt 300. Notably the belt 300 is a continuous belt that is capable of moving in the direction 312 of the areas comprising a seatback 100*a* and the seat 161. Alternatively, both the seatback 100*a* and the seat section 161 would each comprise an additional roller (not shown). These rollers would be housed adjacently to the first main axle 220 (FIG. 2).

The retractable armrest 150 are supported by folding supports 142. The top end of the supports 142*a* is in a slided association with the armrest 150 while the bottom ends 142*b* engage a channel 143. The channel 143 is preferably comprised of a plurality of notches 144 for immobilizing the bottom ends 142*b*. To fold the armrest 150 one would raise pull upward on the armrest 150, inducing the bottom ends 142*b* to be dislodged from the notices 144. One would then press downward on the armrest 150 with some alacrity until the armrest is lowered sufficiently or stowed in a on top of the first frame member 202. Alternatively, the notches 144 may be motorized lower and raise the armrests 50 as desired via the joysticks 150. It is preferred that the folding supports 142 can be fully stowed within the channel 143.

Also visible in FIG. 5 is the first linear actuator 90, the second linear actuator 102, the vertical actuator 240 and the second vertical actuator 242. Also visible is the third vertical actuator 262, the lower support member 320 with the support wheels 330.

Figure 6:
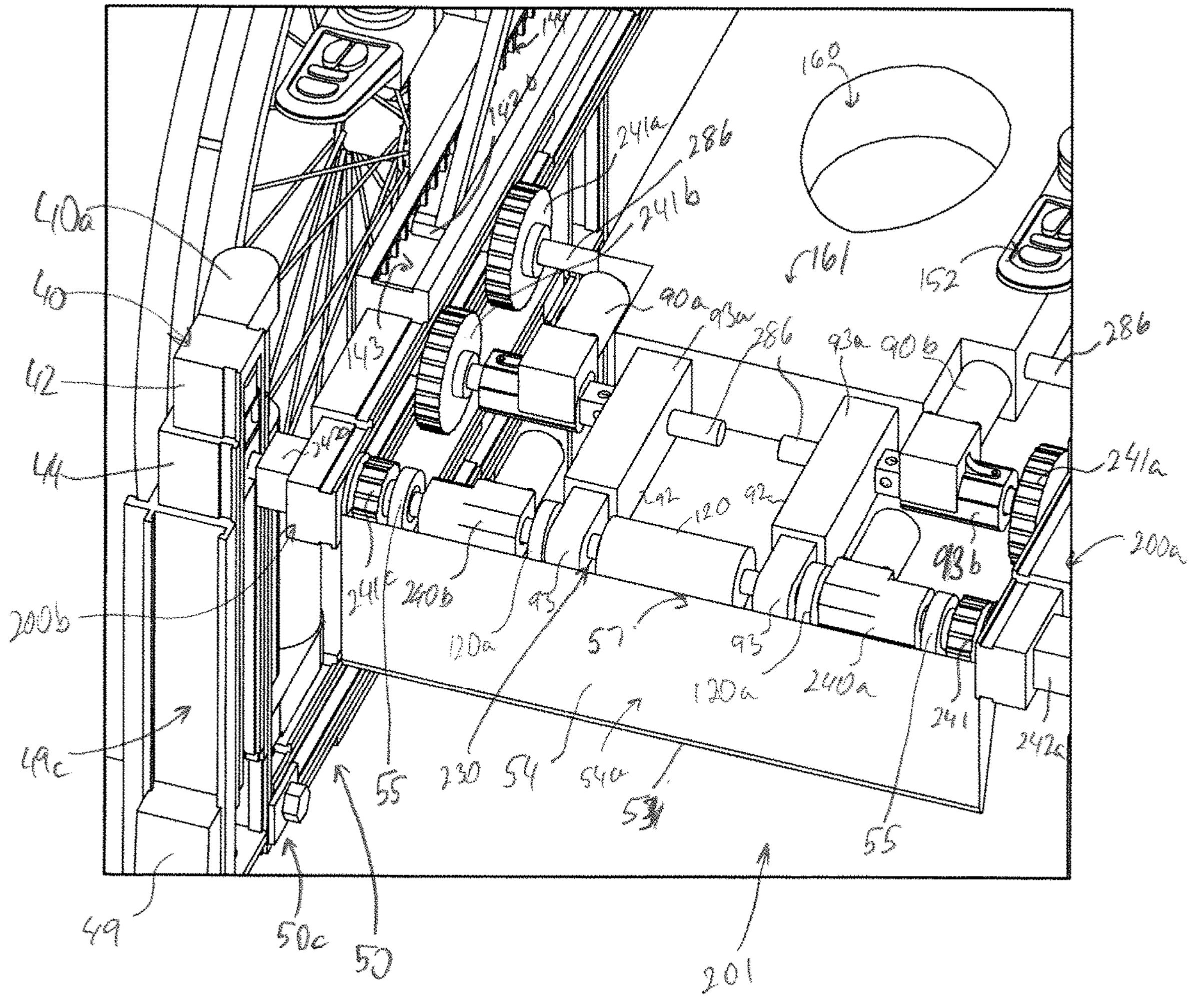
FIG. 6 is a detailed view of the front axle of the disclosed device.

FIG. 6 is a closeup diagram of the first end 201. Shown is the closeup of the second main axle 230. Shown are a first side actuator 240*a* and a second side actuator 240*b*. The first and second side actuators exerting an oblique pressure or pull force onto the axle mounting socket 242*a*. The first wedge 54 having a leading edge 53 and a base 57. The base 57 being adjacent to the second main axle 230 and being mounted attached to it with motorized loops 55. The motorized loops are designed to raise, lower and shimmy the wedge 54. A second wedge 56, is similarly enable at second end 203 (FIG. 2).

In the embodiment shown the first linear actuator 90 is comprised of two actuators 90*a* and 90*b* mounted onto the seat section 161. The power to the actuators in the disclosed mobility device is battery driven. Battery packs may be concealed within the motor case of the first wheels, or within the seat section 161 or seatback component 100 (FIG. 2). The first linear actuator 90 is shown having a motor case 90*a* a drivetrain case 93*b* a stroke tube 93*a* and a socket front end 93 connecting to the second main axle 230. The drivetrain of the linear actuator may be belt driven or gear driven against a captive or non-captive drive screw acting on a stroke arm. Another type of an actuator used in the disclosed device is the rotary actuator. Rotary actuators power the belt wheels 241*a*, motorized loops 55 of the wedge 54 and 56, the first and second drums 120 and 110, the first wheels 26, the steering of the second wheels 46 and the support wheels 330.

Clearly visible in FIG. 6 is the armrest channel 143, having a plurality of notches 144, engaged by the bottom end 142 of the arm rest support arms 140. Also visible are the mounting channel 49*c* for the foot housings 49, telescoping strut components 44 and 42 of the second pair of struts 40 and a top end 40*a* for the third vertical actuator. A plurality of axles 286 serve as rotary actuators for the belt wheels 241*a*. Alternatively, belt wheels 241*a* may rotate on motors mounted within the frame components the belt wheels connect to. The plurality of axles 286 further serves to hold together the first and second plurality of frame components 200*a* and 200*b* forming the support frame 200.

Figure 7:
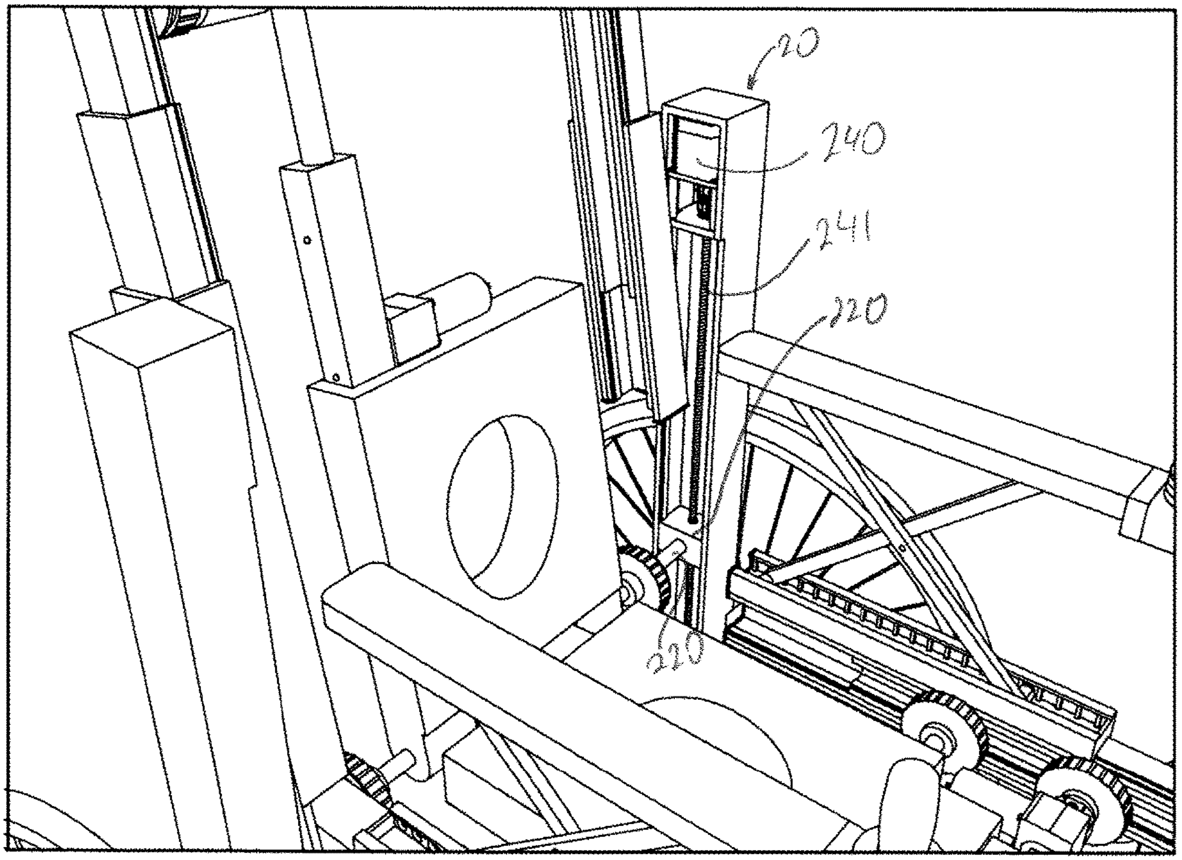
FIG. 7 is a detailed diagram of the first vertical actuator.

FIG. 7 is a further close up diagram, this time showing the first vertical actuator 240. The motor of the first vertical actuator 240 drives a non-captive screw, causing the axle socket 220 to move up or down along the first pair of struts 20. Notably, if the first vertical actuator 240 is only in one of the two struts of the first pari of struts 20, the axle socket 220 not engaged by the actuator screw simply glides along the inner channel of the strut.

Figure 8:
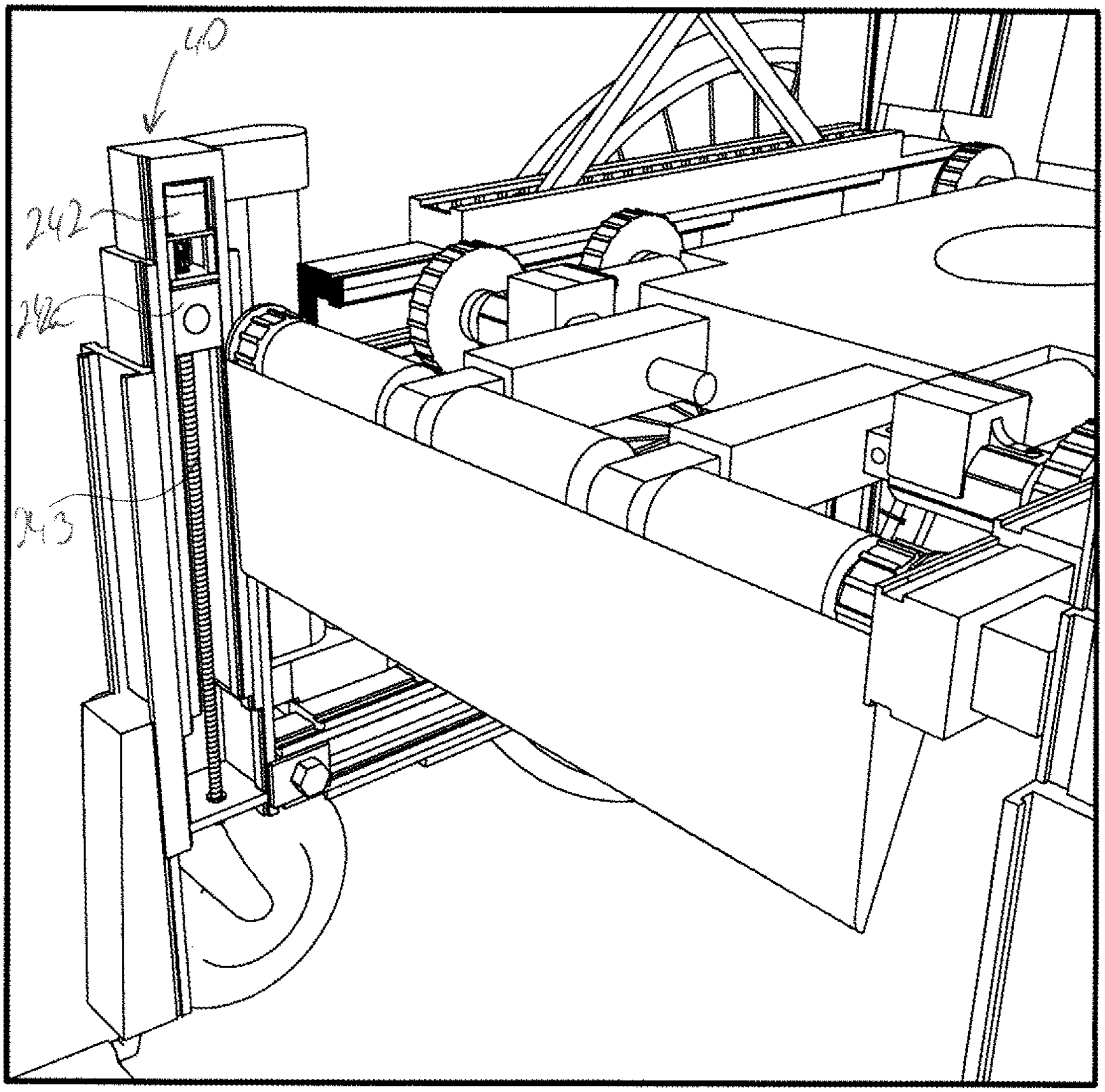
FIG. 8 is the detail diagram of the second vertical actuator.

Similarly, FIG. 8 demonstrates one embodiment of the second vertical actuator 242, leadscrew 243 and axle socket 242*a*, which doubles as the screw nut. It should be noted that the description of actuators provided in in this figure and in the foregoing figures is merely an example and other different actuator configuration are possible, including screw rollers, gear driven screws, bearing nuts, belt driven actuators, etc.

Figure 9A:
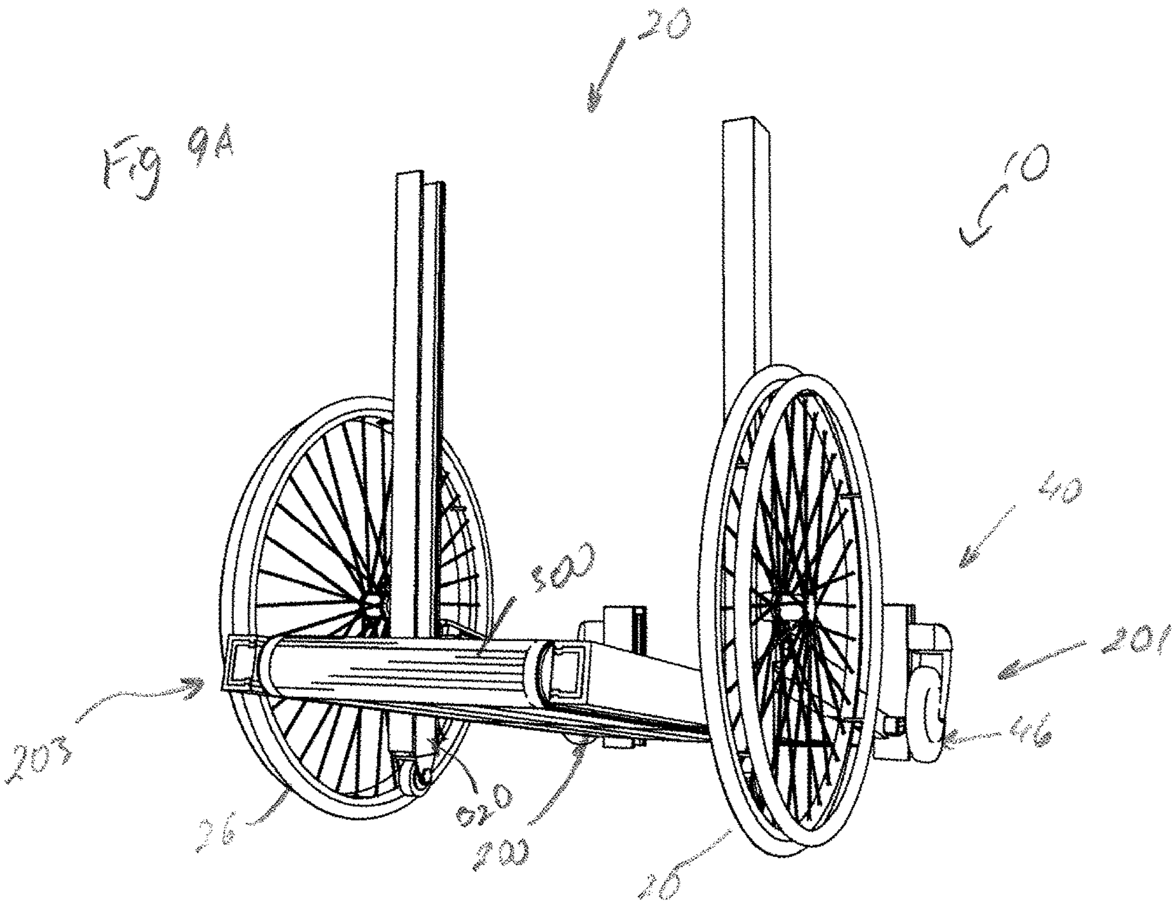
FIGS. 9A and 9B are front and back perspective view of the disclosed device in position for retrieving a patient from the ground.
Figure 9B:
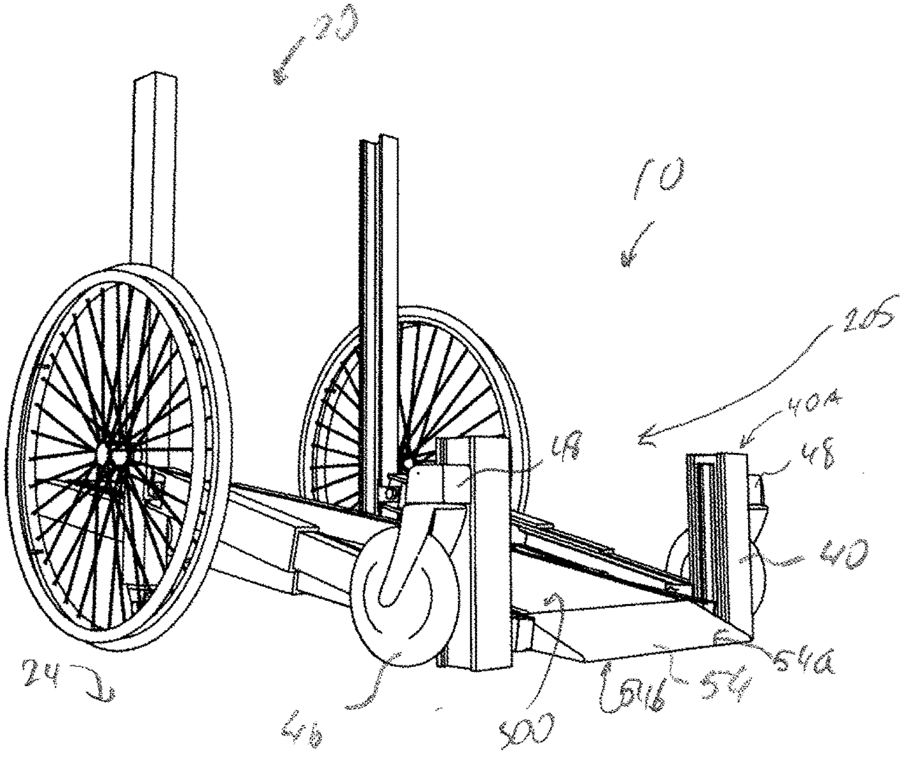

As described above, the mobility device 10 is enabled to be lowered to the ground surface 24 or raised higher than a standard hospital bed. As shown in FIGS. 9A and 9B, the second pair of struts is collapsed completely. With motorized mount 48 for the second wheels 46, mounted within rails 48*c* (see FIG. 1 for a detailed diagram) is displaced substantially toward the top point of the strut 40*a*. In so doing the bottom surface 54*b* is laying on or adjacent to the support surface 24, and the top surface 54*a* is capable for sliding beneath a rider. At the same time, the first main axle 220 is driven downward along the first pair of struts, until it is adjacent to or in contact with the lower support members 320. Furthermore, the foot rest housing 49 would also be shifted upwards within the grooves 49*c*.

Figure 10A:
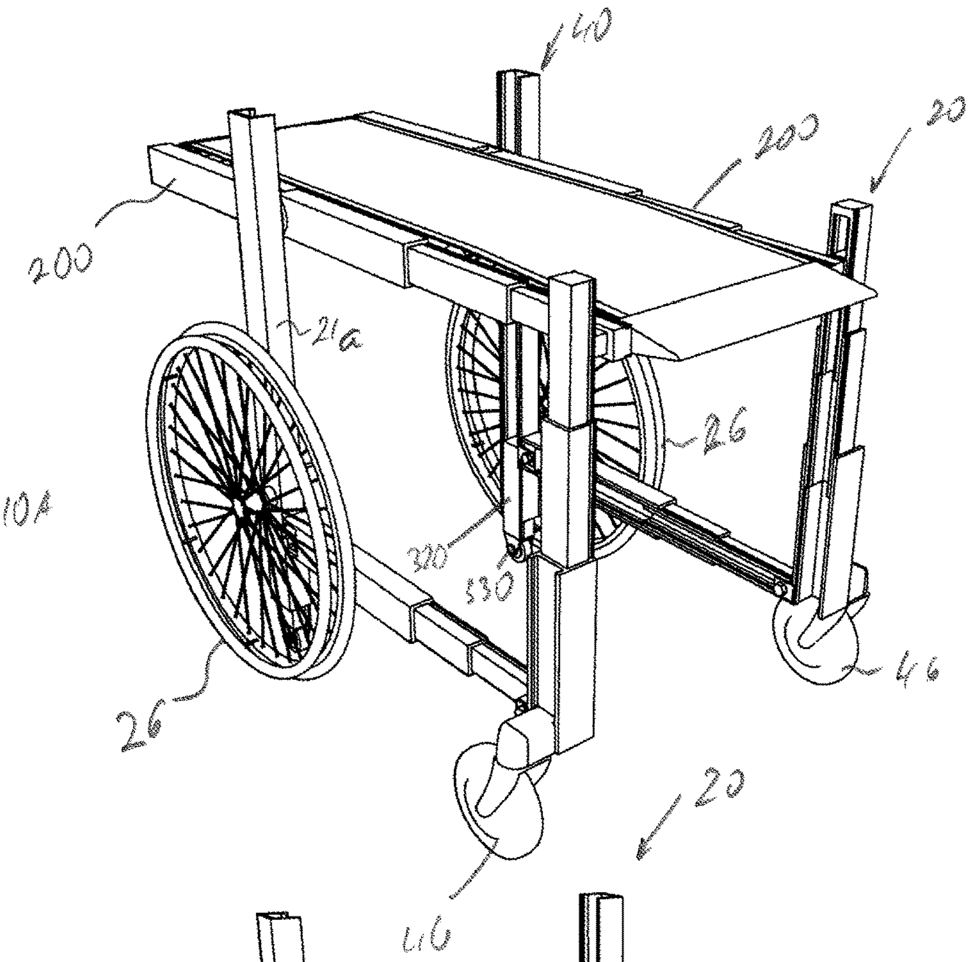
FIGS. 10A and 10B are diagrams of raised and lowered support frame.
Figure 10B:
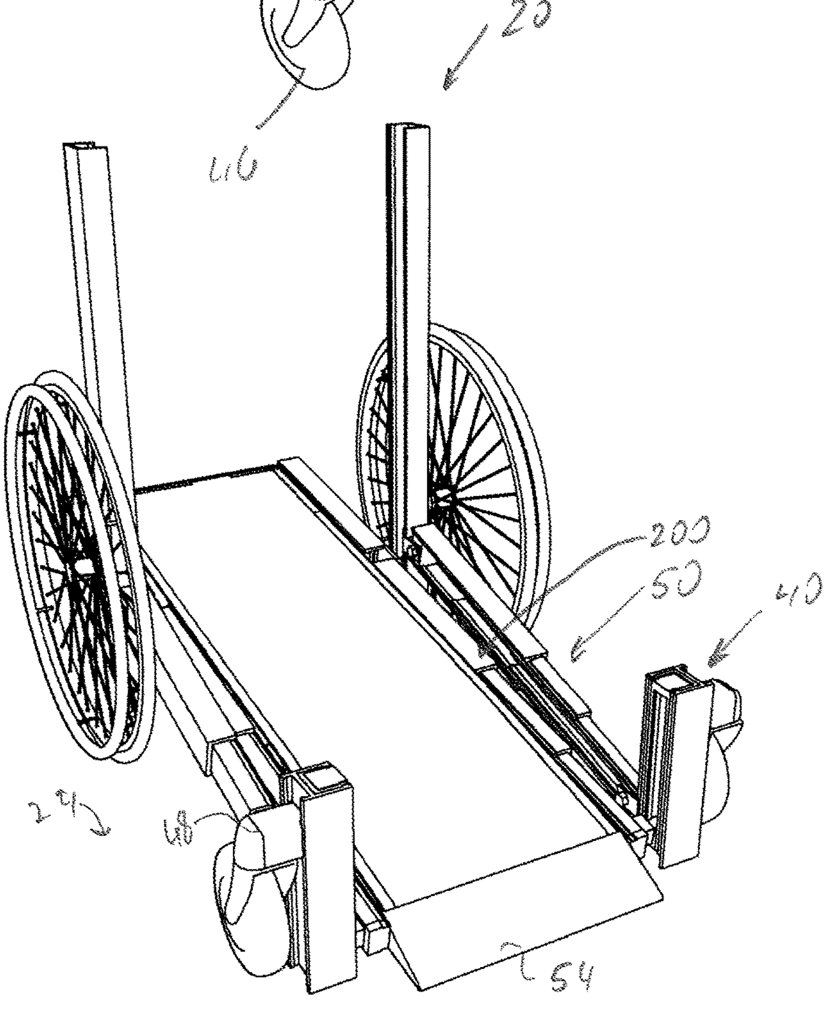

In FIG. 10A the support frame 200 is lifted to the upper maximum extensions of the first and second pairs of struts 20 and 40. Notably, while the first pair of struts is shown having a one non-telescoping rail 21*a*, with actuators and support members moving linearly within the rail 21*a*, additional telescoping components may be provide to raise the support frame even further. Similarly, the support frame can be lowered to be even lower than tie members 50 to be substantially level with the ground surface 24, especially when the motor mounts 48 are raised along the second pair of struts and the lower support members 320 are lowered.

Figure 11A:
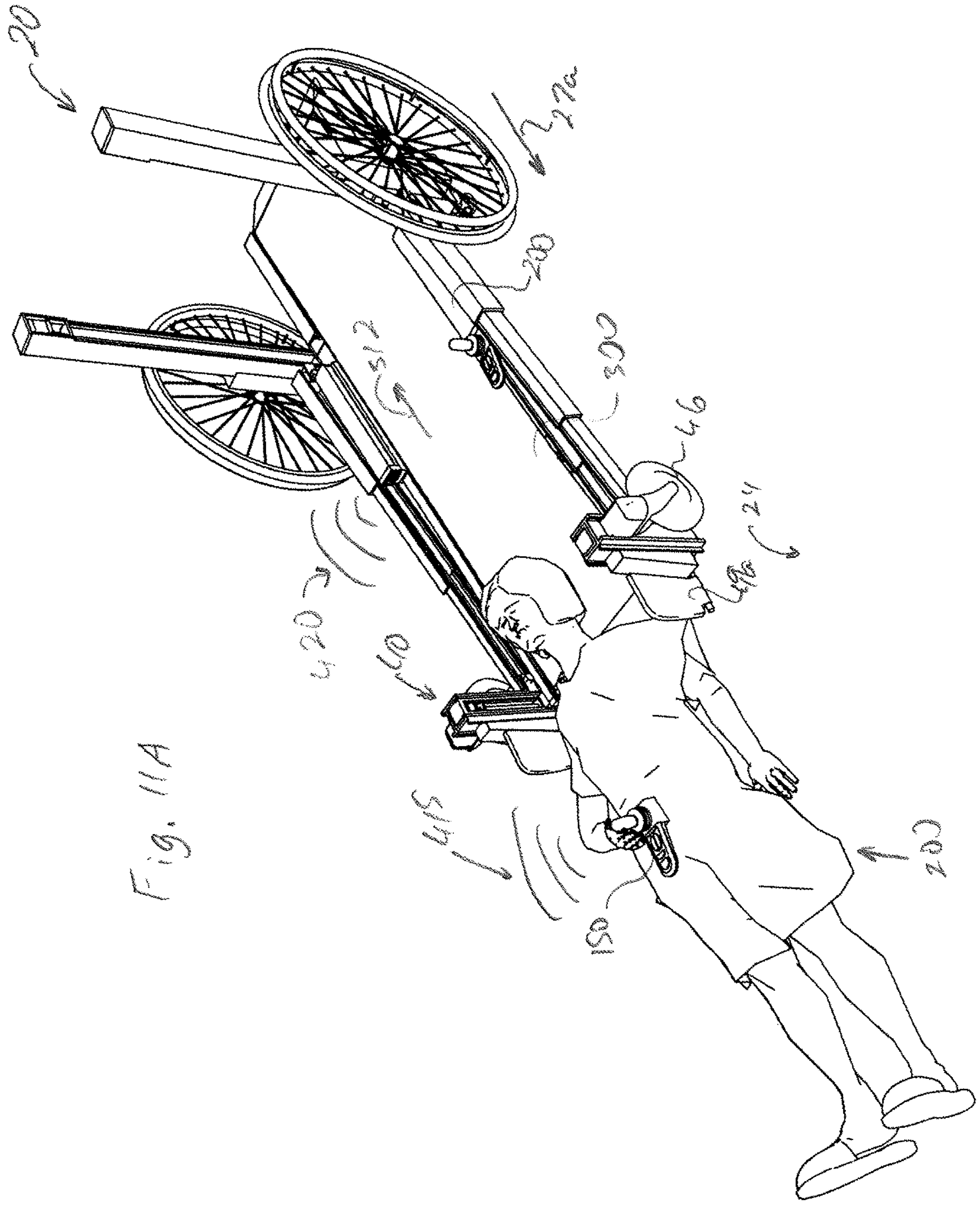
Figure 11B:
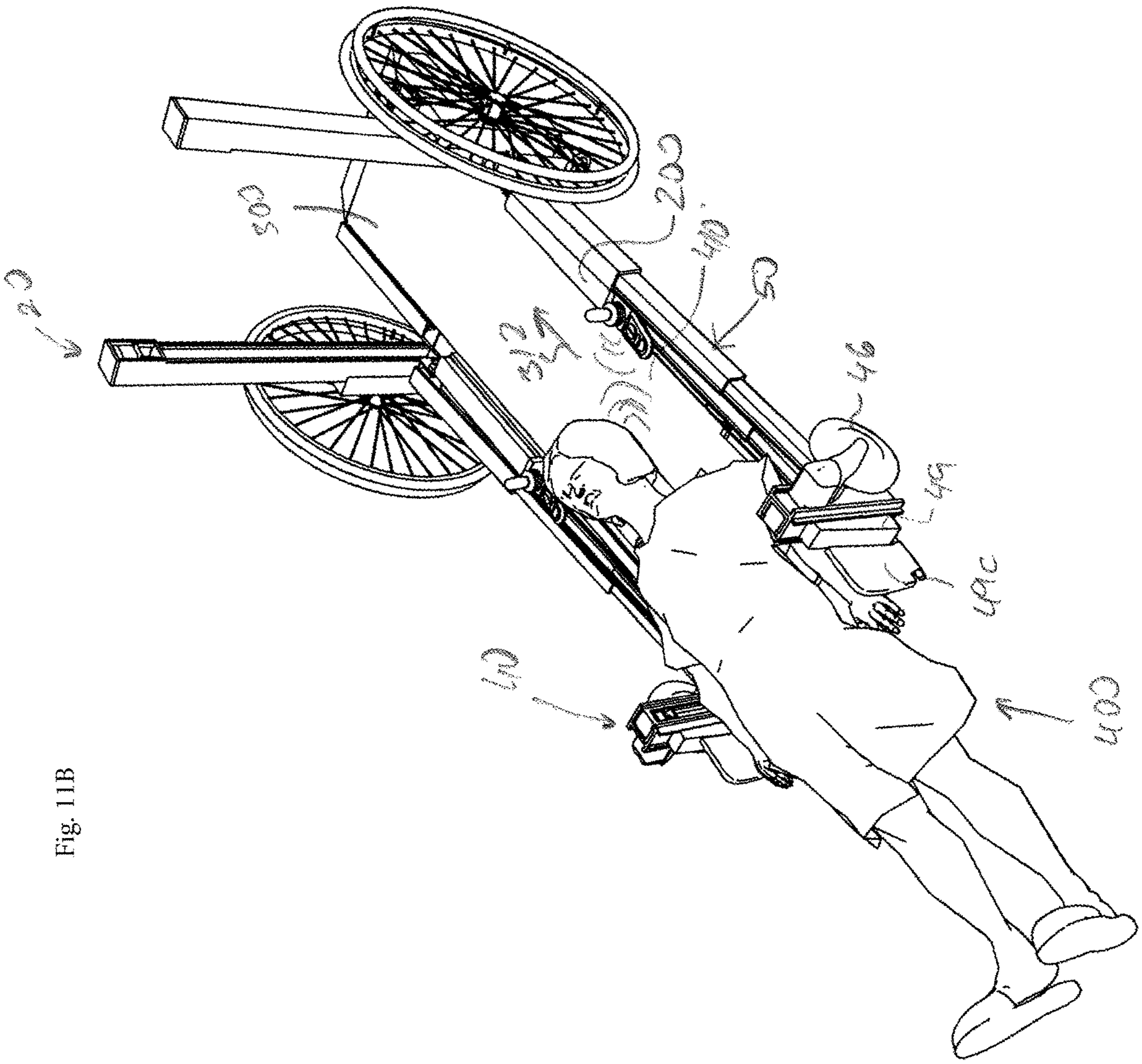

FIGS. 11A and 11B illustrate the process of lifting a patient off a floor surface. Shown is a person 400 in a supine position. The person may also be on his or her side or in a prone position. If possible, the person 400 may reach back to remove one of the joysticks 150 to control the mobility device 10. The joysticks 150 may each control separate functions or configured to be redundant or both. With redundant joysticks, on can always be removably mounted on the support frame 200 and the other joystick 150 may be near the patient 400. The joysticks 150 would then communicate wirelessly with a radio receiver on the mobility device 10. Additionally, the mobility device 10 may be configured with a microphone and voice recognition software being attuned to a particular voice or command within a certain proximity 410, which may be immediate vicinity or a certain immediate radius around the device 10.

The person 400 uses voice or joystick 150 to drive the mobility device in direction 27*a*, steering with second wheels 46 as necessary. Once the device 10 is sufficiently close by, the person, or the person's assistant, lowers the support frame 200, bringing the first wedge 54 in contact with the floor surface 24. The footrests 49*a* are then directed folded out of the way. In an embodiment where pivots 49*b* are electronically actuated, this step can also be done at the push of a button. The device is then propelled further in the direction 27*a* until the wedge 54 is beneath the patient 400 some part of the person's body is in contact with the belt 300. The belt 300 can then be activated in the direction 312 to pull electronically, until the patient is safely on the support frame 200. The entire motor enabled process may be programmed into the joystick and be activated with a single action. Then unless there is an interference or an aberrational event necessitating an override, the process can automatically continue until completion.

Figure 11D:
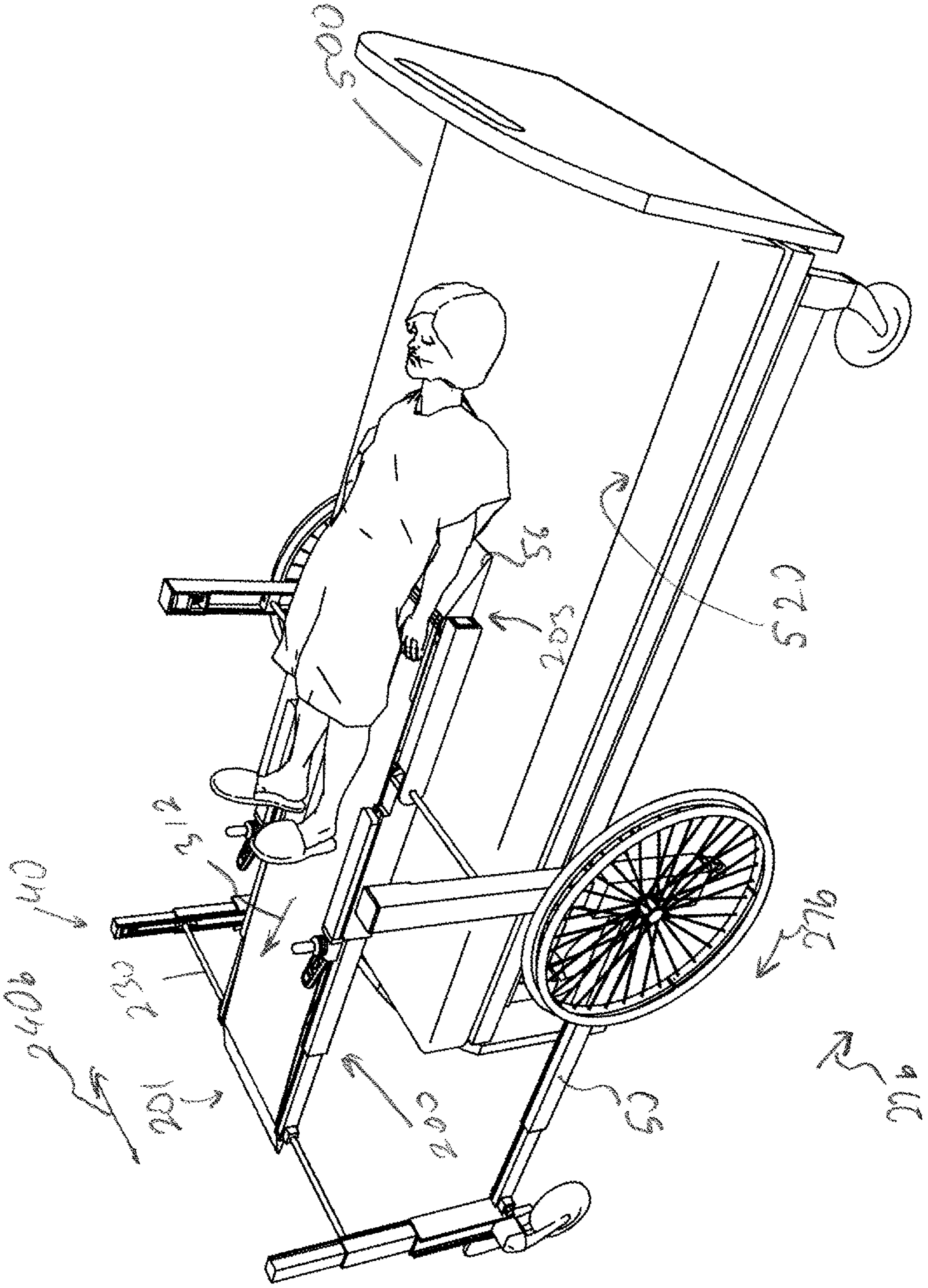
Figure 11E:
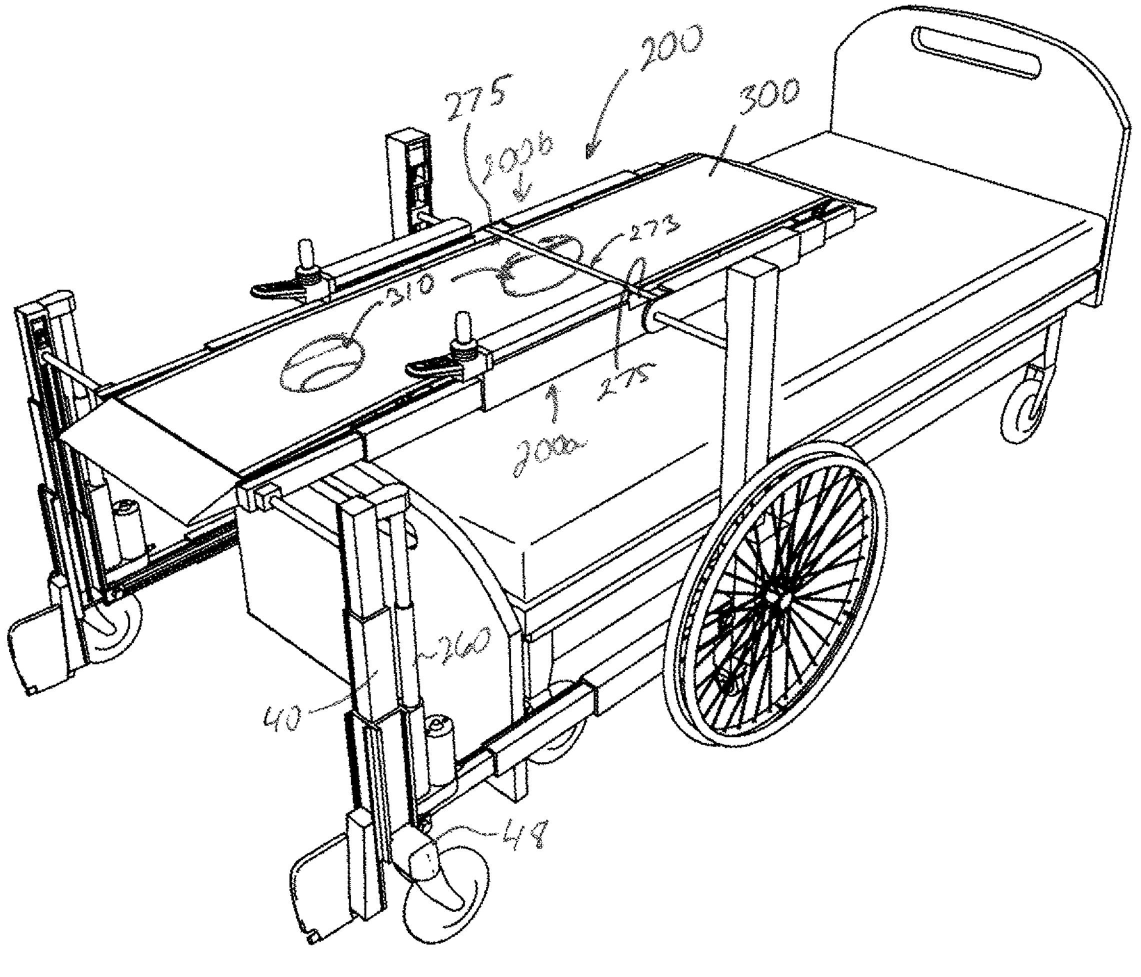
FIG. 11E is another demonstration of the mobility device unfolded and having hygienic openings.

FIGS. 11C and 11D demonstrate the use of the mobility device 10. In FIG. 11C, the patient 400 is on the support frame 200. At the push of a button, the first and second sides 201*c* and 201*d* expand in the direction 240*c* to be wider than the sides 510 of the bed 500. At that point, the first and second main axles, 220 and 230, respectively, are raised to be oriented above the mattress surface 520. The device 10 is then driven in the direction 27*a* to overlap with the mattress surface 520. Notably this operation may be performed from the first end 201 or the second end 203. Once the support frame 200 is over the bed 500, the belt is activated in the direction 312*a* with the user 400 is shifted unto the mattress surface 520 over the second wedge 56 (or the first edge 54). The device 10 is then reversed in the direction 27*b*, with the belt 300 still rotating in the direction 312*a*, causing any part of the patients body not already on the bed surface 520, to now slide over said surface.

Figure 12:
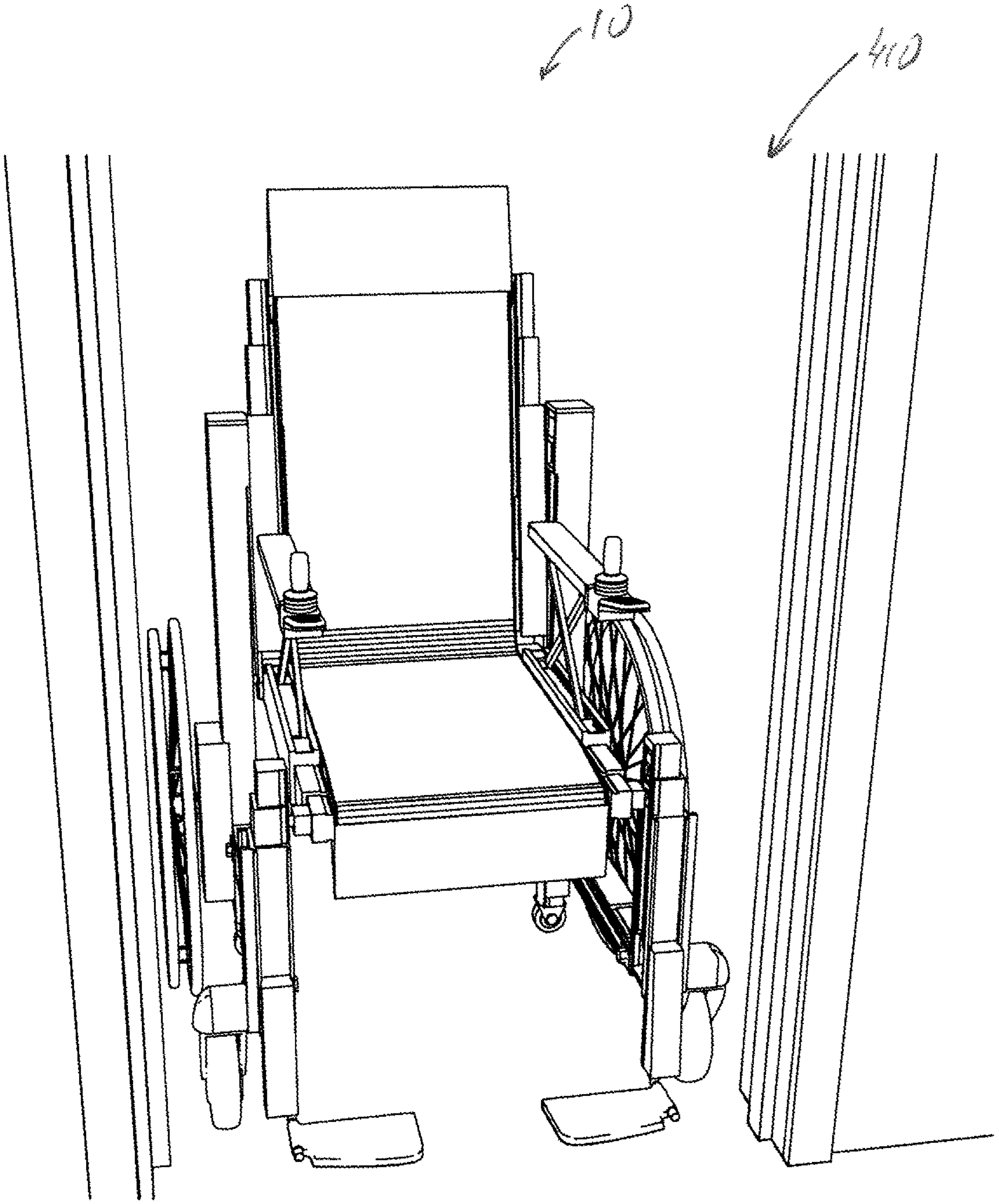
FIG. 12 is another contextual diagram demonstrating the chair being fitted through a doorway.
Figure 13:
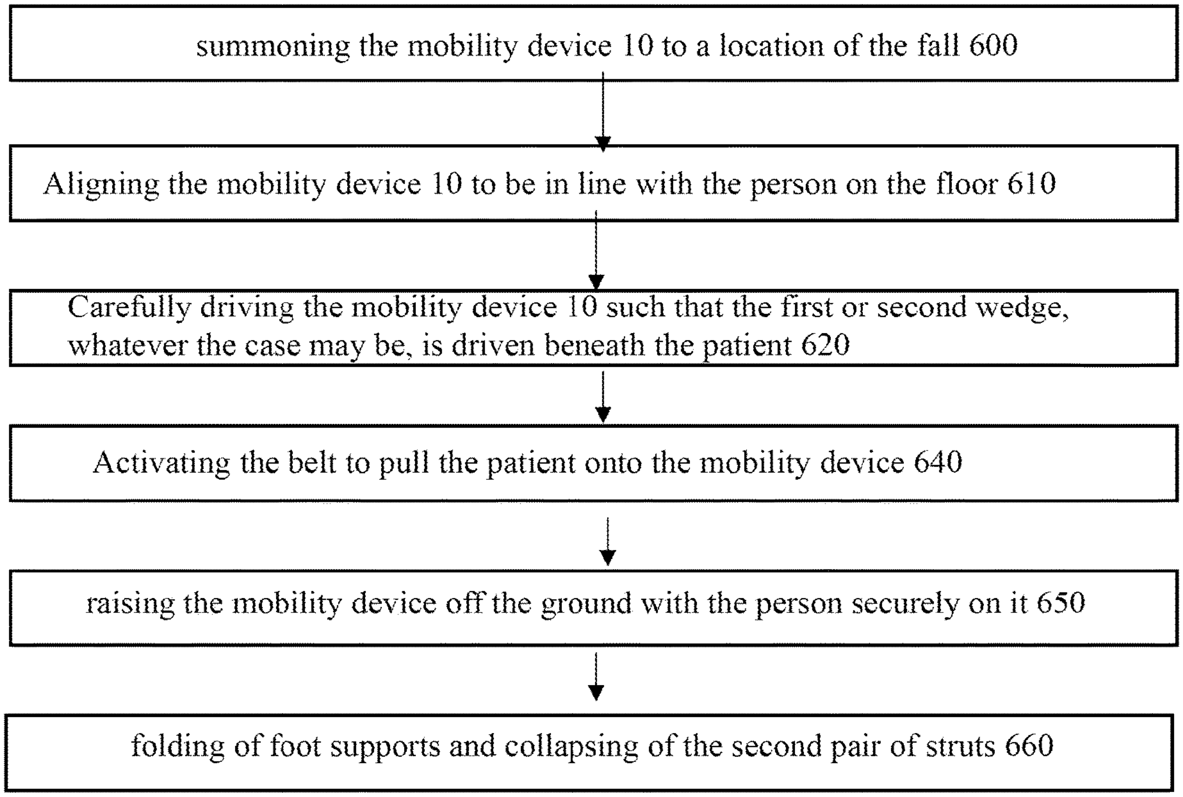
Figure 14:
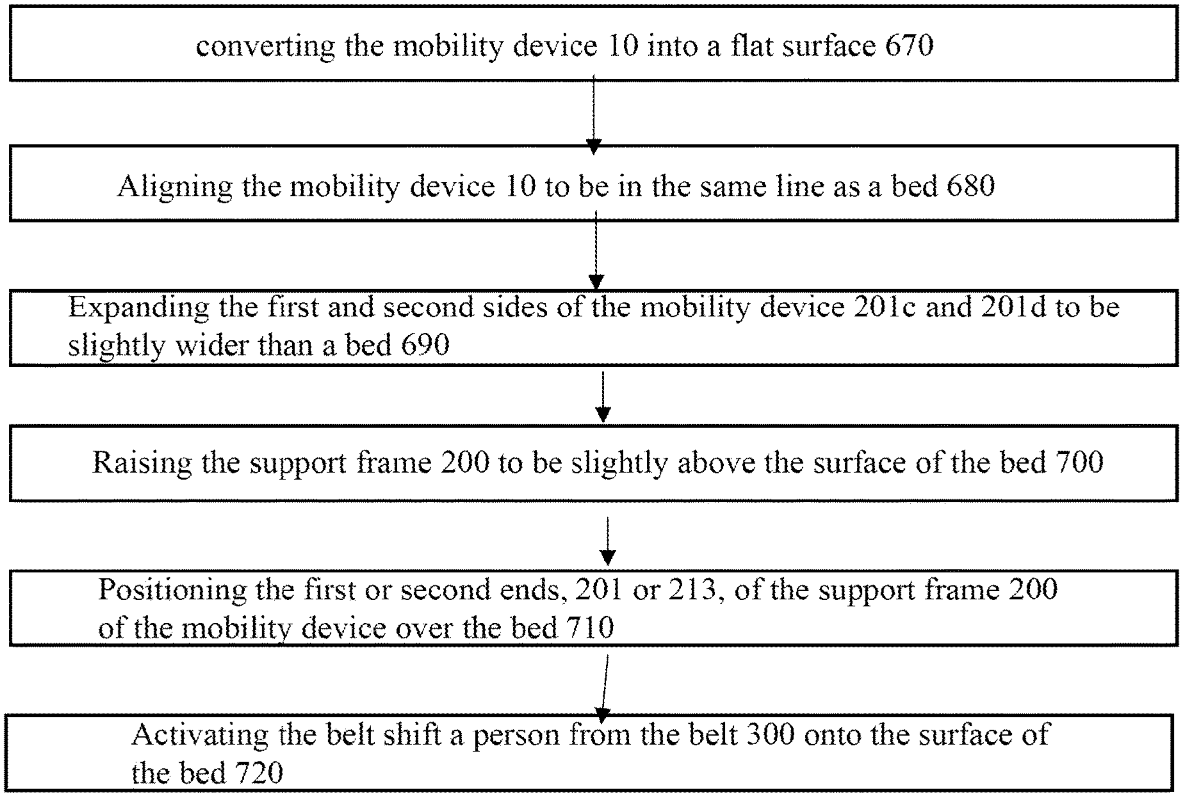

FIG. 11D may also illustrate the lifting of the patient 400 off the surface 520. The device 10 is driven in the direction of 27*a* until the support fame 200 overlaps with the bed 500. The leading wedge, 54 or 56 is driven under a person 400 and then the belt is activated in the direction 312 (or 312*a*, whatever the case may be) until the user is on the support frame 200. The device 10 is then driven in the direction of 27*b*, with the support frame 200 lowered and the sides 201*c* and 201*d* narrowed until they reach a desired width, which may be the width sufficient to drive the device through a door frame 410 as demonstrated in FIG. 12, with a standard doorframes ranging between 82 cm and 92 cm.

The present invention further demonstrates a method of lifting a patient off the floor or any support surface. Method requires the mobility device 10 of having a mobility device having a first pair of support struts 20 and a second pair of support struts 10 in a parallel and spaced apart association from each other and joined by at least one telescoping tie 50; housing a support frame 200 comprised of a first plurality of telescoping frame members 201*a* in a spaced apart and parallel association with a second plurality of telescoping frame members 201*b* joined together by a plurality of axles 286. One of the plurality of axles 286 being a first main support axle 220 and a second main support axle 230. The first and second pairs of support struts each further comprising a vertical actuator 240 and 242 and wherein said first and second axle further comprising a side actuator 240*a* and 222. Where the second main axle 230 further comprising a first wedge 54 pivoting about said second main axle with a ridge of said wedge extending in a direction away from said second main axle 230, a belt 300 in a closed loop covering said second main axle 230 and stretching rearwardly to an at least one axle past said first main axle, wherein said belt rotatingingy motorized to linearly move around said support frame 200. The second vertical actuator 242 of the second pair of struts 40 is configured to lower the second main axle 230. The mobility device 10 is linearly actuated to drive said wedge beneath a person 400 on a floor. There is preferably a wedge on both ends 201 and 203 of the support frame 200, that are configured to pivot about said second main axle 230 or the secondary axle 216, to shimmy further beneath a patient 400 laying on the ground 24. The belt 300 is displaced rearwardly using rotational force of said second main axle 230 and plurality of axles in the back of the second mail axle 230. Where the force of said belt pulling said patient onto said support frame 200. The vertical actuator 240 of said first pair of struts 20 and the second vertical actuator 242 of the second pair of struts 40 configured to raise the support frame 200 into a substantially horizontal position in support of a patient 400.

The method therefore comprises the step of summoning the mobility device 10 to a location of the fall 600. Aligning the mobility device 10 to be in line with the person on the floor 610. Carefully driving the mobility device 10 such that the first or second wedge, whatever the case may be, is driven beneath the patient 620. Activating the belt to pull the patient onto the mobility device 640 and raising the mobility device off the ground with the person securely on it 650. The method may be further comprised of the steps of converting the mobility device 10 from a chair to a flat device to lift the patient, and back to a chair once the patient has been lifted. An additional step may be the folding of foot supports and collapsing of the second pair of struts 660.

A second method enabled with the disclosed invention is to transfer a user of the mobility device 10 from the device unto a bed. The steps of this method include converting the mobility device 10 into a flat surface 670. Aligning the mobility device 10 to be in the same line as a bed 680. Expanding the first and second sides of the mobility device 201*c* and 201*d* to be slightly wider than a bed 690. Raising the support frame 200 to be slightly above the surface of the bed 700. Positioning the first or second ends, 201 or 213, of the support frame 200 of the mobility device over the bed 710. Activating the belt shift a person from the belt 300 onto the surface of the bed 720.

A third method enabled with the disclosed invention is to transfer a user of the mobility device 10 from the bed and unto the device. The steps of this method include converting the mobility device 10 into a flat surface 670. Aligning the mobility device 10 to be in the same line as a bed 680. Expanding the first and second sides of the mobility device 201*c* and 201*d* to be slightly wider than a bed 690. Raising the support frame 200 to be slightly above the surface of the bed 700. Positioning the first or second ends, 201 or 213, of the support frame 200 of the mobility device over the bed with the wedge facing beneath the patient 720. Driving the wedge slightly further beneath the patient 730. Activating the belt to shift a person the bed onto the surface of the bed 740. Backing the mobility device away from the bed 750 and returning the mobility device back to ordinary dimensions 760.

FIG. 16 further demonstrates a method of using the mobility device 10 in a way that permits a patient thereon to urinate or defecate by utilizing vertically aligned openings 310. The method begins with alignment of a patient's excretion openings with a belt opening 310 in step 780. Activating the belt 300 to align the openings 310 to form a vertical chute in step 790. If necessary, directing the support wheels 46 and 26 to shift the mobility device over a plumbing facility, such as a toilet or a container positioned below the vertical chute in step 800.

Although this invention has been described with a certain degree of particularity, it is to be understood that the present disclosure has been made only by way of illustration and that numerous changes in the details of construction and arrangement of parts may be resorted to without departing from the spirit and the scope of the invention. While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and, sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims, as currently written or as amended or added in the future. Descriptions of exemplary methods or processes are not limited to inclusion of all steps as being required in all cases, nor is the order that the steps are presented to be construed as required or necessary unless expressly so stated.

What is claimed:

1. A mobility device comprising: a pair of first struts, said pair of first struts being in a parallel and set apart association with each other; each strut of said first pair of struts having a main wheel rotatingly attached thereto; wherein said main wheel supporting said strut that is rotatingly connects to a support surface; a pair of second struts, said pair of second struts being in a parallel and set apart association with each other; each strut of said second pair of struts having a main wheel rotatingly attached thereto; wherein said main wheel supporting said strut that is rotatingly connects to a support surface; wherein said pair of first struts and said pair of second struts are in a parallel and set apart association with each other; at least two ties; wherein a first of said at least two ties connecting to one strut of said first pair of struts and to one strut of said second pair of struts; and wherein a second of said at least two ties oriented in a parallel and set apart orientation with said first tie of said at least two ties connecting the other strut of said first pair of struts and the other strut of said second pair of struts; wherein said first and said second ties forming a lengthwise side; each strut of said second pair of struts comprised of hollow telescoping components; and wherein said first tie and said second tie of said at least two ties comprised of hollow telescoping components; a support frame; said support frame comprising a first plurality of frame components and a second plurality of frame components; said first plurality of frame components and said second plurality of frame components having a first frame component and at least one forward frame component; wherein each said first frame component and each said at least one forward frame component having a first end and a second end; wherein said first plurality and said second plurality of frame components being in a parallel and spaced apart association with each other; wherein said first end of each first frame component and each at least one forward frame component having a rotatable joint; wherein each said rotatable joint of the first plurality of frame components rotatingly coupling the opposing and parallel rotatable joint of the second plurality of frame components; wherein one of said axles that rotatingly couples with the first end of the first frame component of the first plurality of frame components and with the first end of the first frame component of the second plurality of frame components being a first main axle and wherein a frontmost axle of said axles forming a second main axle; wherein the second end of said first frame component of the first and second plurality of frame components in a slidable and telescoping association with said at least one forward frame component; a rear frame component of said first plurality of frame components and a rear frame component of said second plurality of frame components further comprising secondary frame components; said rear frame component of said first plurality and said second plurality of frame components having a distal end and a proximal end; wherein said distal of each said rear frame component being in slidable and telescoping association with said at least one secondary frame component; and wherein a distal end of a rearmost of said of said secondary frame components of said rear frame component of said first plurality of frame components rotatingly connected via a rearmost axle to said distal end of a rearmost secondary frame component of said second plurality of frame components; and wherein said proximal end of said rear frame component of said first plurality of frame components connected through a rear hinge to said first end of said first frame component of the first plurality of frame components, and wherein said proximal end of said rear frame component of said second plurality of frame components connected through a rear hinge to said first end of said first frame component of the second plurality of frame components; wherein said first main axle connecting said struts of the first pair of struts; said first main axle functioning as a rear pivot for said rear hinge of said first plurality of frame components and said rear hinge of said second plurality of frame components; said rear hinge having a rotary actuator, said rotary actuator connecting to at least one of said rear frame components and at least one of said first frame components; a second main axle connecting struts of said second pair of struts, said second main axle insertedly connecting through said second end of the a forwardmost of said at least one forward frame component of the first and second plurality of frame components; wherein said second main axle forming a front pivot; a belt, said belt wrapping in a closed loop between a secondary axle and said second main axle; and wherein said belt passing beneath a retention bracket adjacently to said rear pivot.

2. The mobility device of claim 1, wherein said rear pivot is a first pivot further comprising a first linear actuator and a second linear actuator; wherein said first linear actuator mounted at said first frame element of said first plurality of frame components or said second plurality of frame components; a forward actuating arm retractably issuing from said first linear actuator, wherein a forward end of said forward actuating arm connecting to said front pivot is a second pivot; wherein said second linear actuator mounted adjacently to said at least one of said rear components; a rearward actuating arm retractably issuing from said second actuator; wherein a distal end of said rearward actuating arm coupling with said second main axle.

3. The mobility device of claim 2, wherein at least one of said first pair of struts further comprising a first vertical actuator; and wherein at least one of said second pair of struts further comprising a second vertical actuator; wherein said first vertical actuator coupled with said first main axle; and wherein said first vertical actuator configured to lower and raise the first main axle; and wherein said second vertical actuator coupled with said second main axle; and wherein said second vertical actuator configured to lower and raise said second main axle.

4. The mobility device of claim 2, wherein said first main axle and said second main axle are further comprised of a first axle component and a second axle component; wherein said first axle component and said second axle component are configured to be obliquely displaceable by at least one side actuator.

5. The mobility device of claim 3, wherein said second main axle mounted into an innermost one of said hollow telescoping components of said second pair of struts;

wherein said second main axle of said pair of second struts is configured to be raised down to said support surface.

6. The mobility device of claim 5, wherein each of said second pair of struts having a lower sliding member; said lower sliding member mounted onto a lower actuator; wherein a bottom point of said lower sliding member further comprising a wheel; and wherein said wheel is configured to come into contact with said support surface when said lower sliding member is lowered downward by said lower actuator; and wherein said lower sliding member further configured to raise off of said support surface said wheel rotatingly connected to said strut of said first pair of struts.

7. The mobility device of claim 5, wherein said second main axle further comprising a wedge; wherein a ridge of said wedge extending forward from said second main axle and wherein said edge rotatingly actuated around said second pivot.

8. The mobility device of claim 7, wherein said secondary axle further comprising a wedge; wherein a ridge of said wedge extending rearward from said second secondary axle and wherein said edge rotatingly actuated around said secondary axle.

9. The mobility device of claim 8, wherein said first frame component of said first plurality of frame components and said first frame component of said second plurality of frame components further comprising collapsible arm rests.

10. The mobility device of claim 9, wherein said wheels of said second pair of struts are configured of full sidelong rotation about said second pair of struts and point of attachment to each of said strut of said second pair of struts, and wherein wheels of said first pair of struts and wheels of said second pair of struts are connected to an electric motor for motorized linear motion of said mobility device.

11. The mobility device of claim 10, wherein said at least one drum on said front most axle or said at least one drum on said second axle having rotational actuator said rotational actuator configured to linearly displace said belt.

12. The mobility device of claim 11, wherein said first linear actuator further comprises an opening and wherein said belt further comprises at least one opening; wherein said opening on the belt is configured to coincide with said opening in said at first linear actuator and wherein said opening in said first actuator and said opening in said belt configured to afford a user of said mobility device an opportunity to use a toilet while still disposed on said mobility device.

13. The mobility device of claim 11, wherein one of said collapsible armrests further comprises a finger activated control pad said finger activated control pad controlling said first actuator, said second actuator said at least one side actuator, a lower actuator, said rotational actuator said first and second vertical actuator and said linear motion of said mobility device.

14. The mobility device of claim 3, wherein said at least one drum on said front most axle or said at least one drum on said second axle having rotational actuator said rotational actuator configured to linearly displace said belt.

15. The mobility device of claim 2, wherein an extension of said forward actuating arm configured to cause a retraction of said rearward actuating arm; and wherein an extension of said rearward actuating arm configured to cause the retraction of said forward actuating arm.

16. The mobility device of claim 15, wherein said secondary axle further comprises at least one drum roller, said at least one drum roller placed between said rear frame components along a secondary axle.

17. The mobility device of claim 4, wherein said first axle component and said second axle component being further encased within a drum roller.

18. The mobility device of claim 2, wherein said first main axle and said second main axle are further comprised of a first axle component and a second axle component; wherein said first axle component is configured to be obliquely displaceable by a first side actuator; and wherein a said second axle component is configured to be obliquely displaceable by a second side actuator.

19. The mobility device of claim 18, wherein said first axle component and said second axle component being further encased within a drum roller.

* * * * *